US012580313B2

(12) United States Patent
Kim et al.

(10) Patent No.: US 12,580,313 B2
(45) Date of Patent: Mar. 17, 2026

(54) WEARABLE DEVICE COMPRISING CONDUCTIVE MEMBER FORMING ANTENNA

(71) Applicant: SAMSUNG ELECTRONICS CO., LTD., Suwon-si (KR)

(72) Inventors: Jongsuk Kim, Suwon-si (KR); Gyusub Kim, Suwon-si (KR); Seho Kim, Suwon-si (KR); Seunghwan Kim, Suwon-si (KR); Un Kim, Suwon-si (KR); Yongjoo Shin, Suwon-si (KR); Myunghun Jeong, Suwon-si (KR); Jaewon Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/780,057

(22) Filed: Jul. 22, 2024

(65) Prior Publication Data

US 2025/0023242 A1 Jan. 16, 2025

Related U.S. Application Data

(63) Continuation of application No. PCT/KR2024/006651, filed on May 16, 2024.

(30) Foreign Application Priority Data

Jul. 14, 2023 (KR) ........................ 10-2023-0092062
Aug. 9, 2023 (KR) ........................ 10-2023-0104466

(51) Int. Cl.
*H01Q 1/27* (2006.01)
*G04G 17/06* (2006.01)
(Continued)

(52) U.S. Cl.
CPC .............. *H01Q 7/00* (2013.01); *G04G 17/06* (2013.01); *H01Q 1/273* (2013.01); *H04B 5/26* (2024.01)

(58) Field of Classification Search
CPC .......... G04G 17/06; H01Q 1/27; H01Q 1/273; H01Q 7/00; H04B 5/26
See application file for complete search history.

(56) References Cited

U.S. PATENT DOCUMENTS 10,297,909 B2 5/2019 Kim et al.
10,355,344 B1 7/2019 Ruaro et al.
(Continued)

FOREIGN PATENT DOCUMENTS

CN 216720286 U 6/2022
CN 217062499 U 7/2022
(Continued)

OTHER PUBLICATIONS

International Search Report and Written Opinion dated Sep. 9, 2024, issued by the International Searching Authority in International Application No. PCT/KR2024/006651.

*Primary Examiner* — Tho G Phan
(74) *Attorney, Agent, or Firm* — Sughrue Mion, PLLC

(57) ABSTRACT

A wearable device may include: a metal frame; a display; a printed circuit board (PCB); a wireless charging coil; a conductive member disposed between the wireless charging coil and the PCB, facing the wireless charging coil, and spaced apart from the wireless charging coil; and a wireless communication circuit disposed on the PCB. The wireless communication circuit may be configured to transmit or receive a radio frequency (RF) signal using the metal frame, the conductive member may be coupled to the wireless
(Continued)

charging coil, and the conductive member, the wireless charging coil, and the display may be configured to be a ground for the metal frame.

20 Claims, 21 Drawing Sheets

(51) Int. Cl.

| | | |
|---|---|---|
| *H01Q 7/00* | (2006.01) | |
| *H04B 5/26* | (2024.01) | |

(56) References Cited

U.S. PATENT DOCUMENTS

| | | | | |
|---|---|---|---|---|
| 10,439,268 | B2 * | 10/2019 | Son | H04B 1/385 |
| 10,447,080 | B2 * | 10/2019 | Jung | H04B 5/79 |
| 10,594,026 | B2 | 3/2020 | Choi et al. | |
| 10,608,329 | B2 | 3/2020 | Jung et al. | |
| 10,644,383 | B2 * | 5/2020 | Da Costa Bras Lima | |
| | | | | H01Q 1/38 |
| 10,879,597 | B2 * | 12/2020 | Kang | H01Q 1/24 |
| 11,018,414 | B2 * | 5/2021 | Sung | H01Q 1/245 |
| 11,848,563 | B2 | 12/2023 | Kim et al. | |
| 11,853,016 | B2 * | 12/2023 | Ruaro | G04R 60/10 |
| 12,424,731 | B2 * | 9/2025 | Shin | G04G 17/04 |
| 2023/0077596 | A1 | 3/2023 | Hurwitz et al. | |
| 2023/0121035 | A1 | 4/2023 | Kim et al. | |
| 2024/0103573 | A1 | 3/2024 | Yun et al. | |

FOREIGN PATENT DOCUMENTS

| | | | |
|---|---|---|---|
| EP | 4216001 | A1 | 7/2023 |
| EP | 4 387 046 | A1 | 6/2024 |
| KR | 10-2177285 | B1 | 11/2020 |
| KR | 10-2021-0015460 | A | 2/2021 |
| KR | 10-2216758 | B1 | 2/2021 |
| KR | 10-2352448 | B1 | 1/2022 |
| KR | 10-2022-0059268 | A | 5/2022 |
| KR | 10-2447757 | B1 | 9/2022 |
| KR | 10-2022-0139041 | A | 10/2022 |
| KR | 10-2458690 | B1 | 10/2022 |
| KR | 10-2023-0001451 | A | 1/2023 |
| KR | 10-2023-0001477 | A | 1/2023 |
| KR | 10-2023-0043413 | A | 3/2023 |
| WO | 2022/055257 | A1 | 3/2022 |
| WO | 2023/277337 | A1 | 1/2023 |

* cited by examiner

WEARABLE DEVICE COMPRISING CONDUCTIVE MEMBER FORMING ANTENNA

CROSS-REFERENCE TO RELATED APPLICATION(S)

This application is a continuation application, claiming priority under § 365(c), of an International application No. PCT/KR2024/006651, filed on May 16, 2024, which is based on and claims the benefit of a Korean patent application number 10-2023-0092062, filed on Jul. 14, 2023, in the Korean Intellectual Property Office, and of a Korean patent application number 10-2023-0104466, filed on Aug. 9, 2023, in the Korean Intellectual Property Office, the disclosure of each of which is incorporated by reference herein in its entirety.

BACKGROUND

1. Field

The following descriptions relate to a wearable device comprising a conductive member forming an antenna.

2. Description of Related Art

Various portable communication devices such as a smartphone, a tablet, and a wearable device are being developed. Among them, the wearable device such as a smart watch is gaining great popularity as it provides various functions and convenience.

With advances in communication technology, communication frequency for these devices is increasing. Accordingly, design and implementation of an antenna that supports various radio frequencies is required.

The above-described information may be provided as a related art for the purpose of helping to understand the present disclosure. No claim or determination is raised as to whether any of the above-described information may be applied as a prior art related to the present disclosure.

SUMMARY

According to one or more example embodiments, a wearable device may include: a metal frame; a display; a printed circuit board (PCB); a wireless charging coil; a conductive member disposed between the wireless charging coil and the PCB, facing the wireless charging coil, and spaced apart from the wireless charging coil; and a wireless communication circuit disposed on the PCB. The wireless communication circuit may be configured to transmit or receive a radio frequency (RF) signal using the metal frame, the conductive member may be coupled to the wireless charging coil, and the conductive member, the wireless charging coil, and the display may be configured to be a ground for the metal frame.

The PCB may include: a first portion forming a first part of a periphery of the PCB; a second portion spaced apart from the first portion and forming a second part opposite the first part of the periphery; and a third portion between the first portion and the second portion, forming a remaining part of the periphery. The wireless communication circuit may be configured to feed the metal frame that is connected to the first portion of the PCB, the conductive member and the wireless charging coil may be respectively connected to the first portion, the display may be connected to the second portion, and the metal frame may be connected to the second portion.

The wireless communication circuit may be configured to feed the metal frame through a first point on the first portion of the PCB, the conductive member may be connected to a ground of the PCB through a second point on the first portion of the PCB, the wireless charging coil may be connected to the ground of the PCB through a third point on the first portion of the PCB, the display may be connected to the ground of the PCB through a fourth point on the second portion of the PCB, and the metal frame may be connected to the ground of the PCB through a fifth point on the second portion of the PCB.

From an above view of the PCB, the third point may be located between the first point and the second point.

The second point may be closer to the first point than the second point is to the fourth point and the fifth point.

The third point may be closer to the first point than the third point is to the fourth point and the fifth point.

The wearable device further may include: a first flexible PCB connecting the display to the PCB; a first connector disposed on the PCB and coupled to the first flexible PCB; a second flexible PCB connecting the wireless charging coil to the PCB; a second connector disposed on the PCB and coupled to the second flexible PCB; and a third connector disposed on the PCB and coupled to the conductive member.

The third connector may include a C-clip connector, and the conductive member may be in contact with the C-clip connector.

The wearable device further may include: a shield can disposed on the PCB. The wireless communication circuit may be disposed on the third portion of the PCB, and the shield can may be disposed on the third portion around the wireless communication circuit.

The wearable device further may include at least one of: a first plurality of matching circuits, wherein any one of the first plurality of matching circuits is configured to be selectively connected between the ground and the second point of the PCB; a second plurality of matching circuits, wherein any one of the second plurality of matching circuits is configured to be selectively connected between the ground and the fifth point of the PCB; or a matching circuit connected between the wireless communication circuit and the first point of the PCB.

The conductive member may include: a closed ring shape; an open ring shape with two open ends; or a circular plate shape.

The conductive member may have an open ring shape with two open ends, and based on a direction perpendicular to the PCB, the second point may overlap one end of the two open ends.

The conductive member may include: a first portion parallel to the PCB and facing the wireless charging coil; and a second portion extending from the first portion to the PCB and connecting the first portion to the PCB. The first portion of the conductive member may be spaced apart from the PCB.

The wearable device further may include a cover coupled to the metal frame and configured to contact a body wearing the wearable device. The cover may support the wireless charging coil.

The wearable device further may include a shielding member covering the wireless charging coil that is supported by the cover. The cover may include a support portion including a first surface facing the conductive member and a second surface opposite to the first surface and facing the PCB, the shielding member may include a first surface facing the first surface of the support portion, and the conductive member may be attached to the first surface of the support portion or the first surface of the shielding member.

The second portion of the conductive member may penetrate the support portion.

The wearable device further may include: a capacitor disposed on the PCB. The conductive member may be connected to the wireless charging coil through the capacitor.

According to one or more example embodiments, a wearable device may include: a frame may include a conductive portion; a display; a wireless charging coil; a printed circuit board (PCB); a conductive member disposed between the wireless charging coil and the PCB, facing the wireless charging coil, and spaced apart from the wireless charging coil; and a wireless communication circuit disposed on the PCB. The wireless communication circuit may be configured to transmit or receive a radio frequency signal (RF signal) using the conductive portion, the conductive member may be coupled to the wireless charging coil, the conductive member, the wireless charging coil, and the display may be configured to be a ground for the conductive portion. The PCB may include: a first portion forming a first part of a periphery of the PCB; a second portion spaced apart from the first portion and forming a second part opposite the first part of the periphery; and a third portion between the first portion and the second portion, forming a remaining part of the periphery. The wireless communication circuit may be configured to feed the conductive portion through the first portion to which the conductive portion is connected, the conductive member and the wireless charging coil may be configured to be respectively grounded in the first portion, and the display may be configured to be grounded in the second portion.

The first portion may include: a first point connected to the conductive portion, the wireless communication circuit configured to feed the conductive portion through the first point; a second point at which the conductive member is configured to be grounded; and a third point at which the wireless charging coil is configured to be grounded. The second portion comprises a fourth point at which the display is configured to be grounded.

An entirety of the frame may be formed of the conductive portion.

The conductive portion may be configured to be grounded in the second portion.

The conductive portion may be configured to be grounded at a fifth point on the second portion and at a sixth point spaced apart from the fifth point.

The frame may include a non-conductive frame, and the conductive portion may include a conductive pattern disposed on an inner surface of the non-conductive frame.

The second point may be closer to the first point than the second point is to the fourth point and the fifth point, and the third point may be closer to the first point than the third point is to the fourth point and the fifth point.

The conductive member may include a first portion facing the wireless charging coil and a second portion extending from the first portion such that the first portion is connected to the PCB, and the first portion of the conductive member may be spaced apart from the PCB.

According to one or more example embodiments, a wearable device may include: a frame; a display; a wireless charging coil; a printed circuit board (PCB) between the display and the wireless charging coil; a conductive member disposed between the wireless charging coil and the PCB, facing the wireless charging coil, and spaced apart from the wireless charging coil; and a wireless communication circuit disposed on the PCB. The wireless communication circuit may be configured to transmit or receive a radio frequency signal (RF signal) using the display, the conductive member may be coupled to the wireless charging coil, and the conductive member and the wireless charging coil may be configured to be grounds for the display.

The PCB may include: a first portion forming a first part of a periphery of the PCB; a second portion spaced apart from the first portion and forming a second part opposite the first part of the periphery; and a third portion between the first portion and the second portion, forming a remaining part of the periphery. The wireless communication circuit may be configured to: transmit a signal in a first frequency band by feeding the frame through the first portion connected to the frame; and transmit a signal in a second frequency band different from the first frequency band by feeding the display through the second portion connected to the display. The frame and the wireless charging coil may be respectively configured to be grounded in the first portion.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
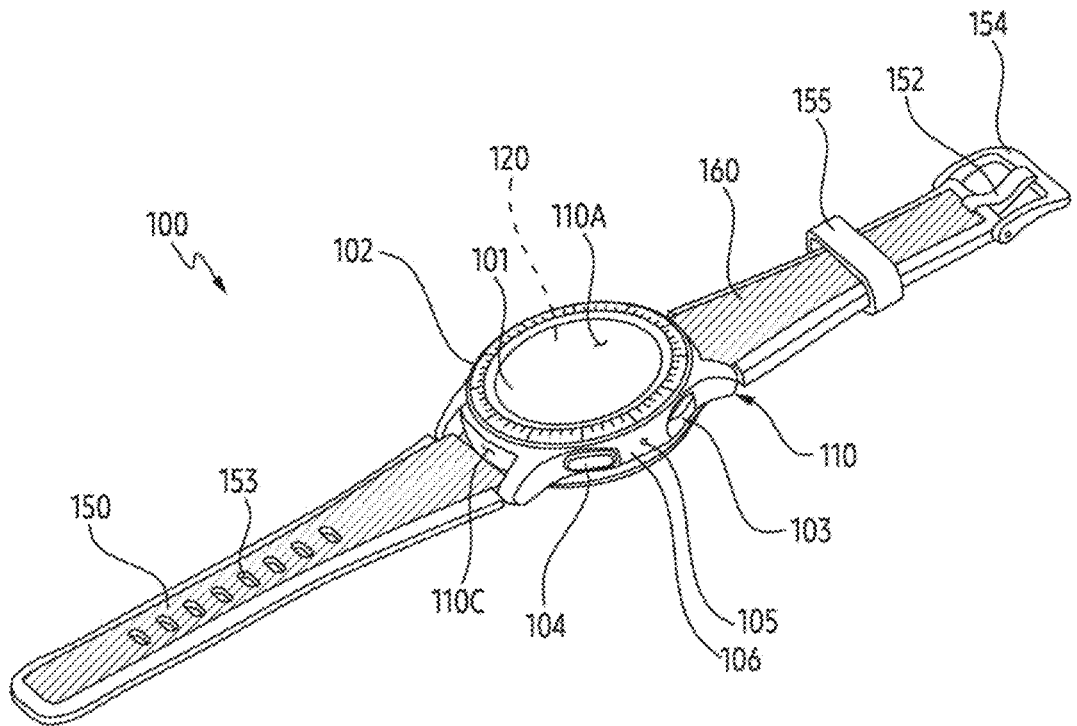
FIG. 1 is a front perspective view of an electronic device according to one or more embodiments.
Figure 2:
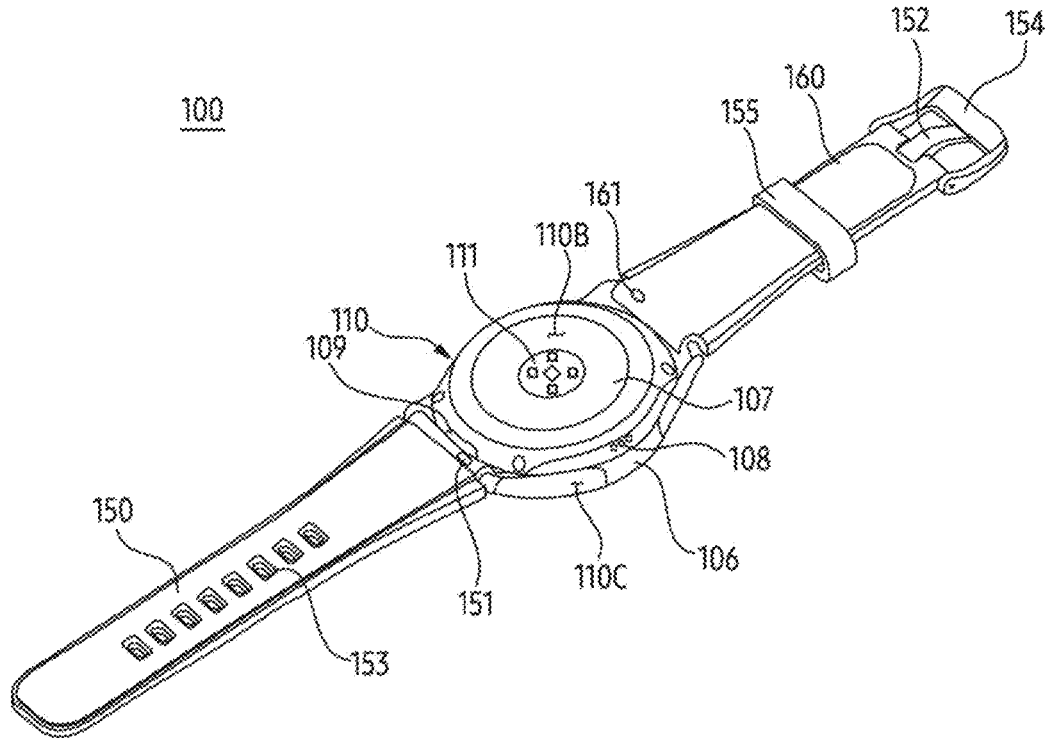
FIG. 2 is a rear perspective view of an electronic device according to one or more embodiments.

FIG. 1 is a front perspective view of an electronic device 100 according to one or more embodiments. FIG. 2 is a rear perspective view of the electronic device 100 according to one or more embodiments. Referring to FIGS. 1 and 2, the electronic device 100 (e.g., an electronic device 2001 of FIG. 20) according to one or more embodiments may include a housing 110 that forms a front surface 110A, a rear surface 110B, and a side surface 110C surrounding a space between the front surface 110A and the rear surface 110B, and fastening members 150 and 160 connected to at least a portion of the housing 110 and configured to detachably bind the electronic device 100 to a portion of a user's body (e.g., wrist and so on). For example, the electronic device 100 may be referred to as a wearable device or a wearable electronic device.

The housing 110 may refer to a structure that forms at least a portion of the front surface 110A, the rear surface 110B, and the side surface 110C. In one or more embodiments, the front surface 110A may be formed by a front plate 101 (e.g., a glass plate including various coating layers or a polymer plate) in which at least a portion thereof is formed to be substantially transparent. The rear surface 110B may be formed by a substantially opaque rear plate 107. The rear plate 107 may be formed, for example, by coated or colored glass, ceramic, polymer, metal (e.g., aluminum, stainless steel (STS), or magnesium), or a combination of at least two of the materials. The side surface 110C may be formed by a frame 106 coupled to the front plate 101 and the rear plate 107. For example, the frame 106 may include metal. For example, the frame 106 may be referred to as a 'metal frame', a 'side member', or a 'side bezel structure'.

The fastening members 150 and 160 may be formed of various materials and shapes. For example, the fastening members 150 and 160 may be formed so that an integral or a plurality of unit links may flow to each other by woven material, leather, rubber, urethane, metal, ceramic, or a combination of at least two of the above materials.

Figure 20:
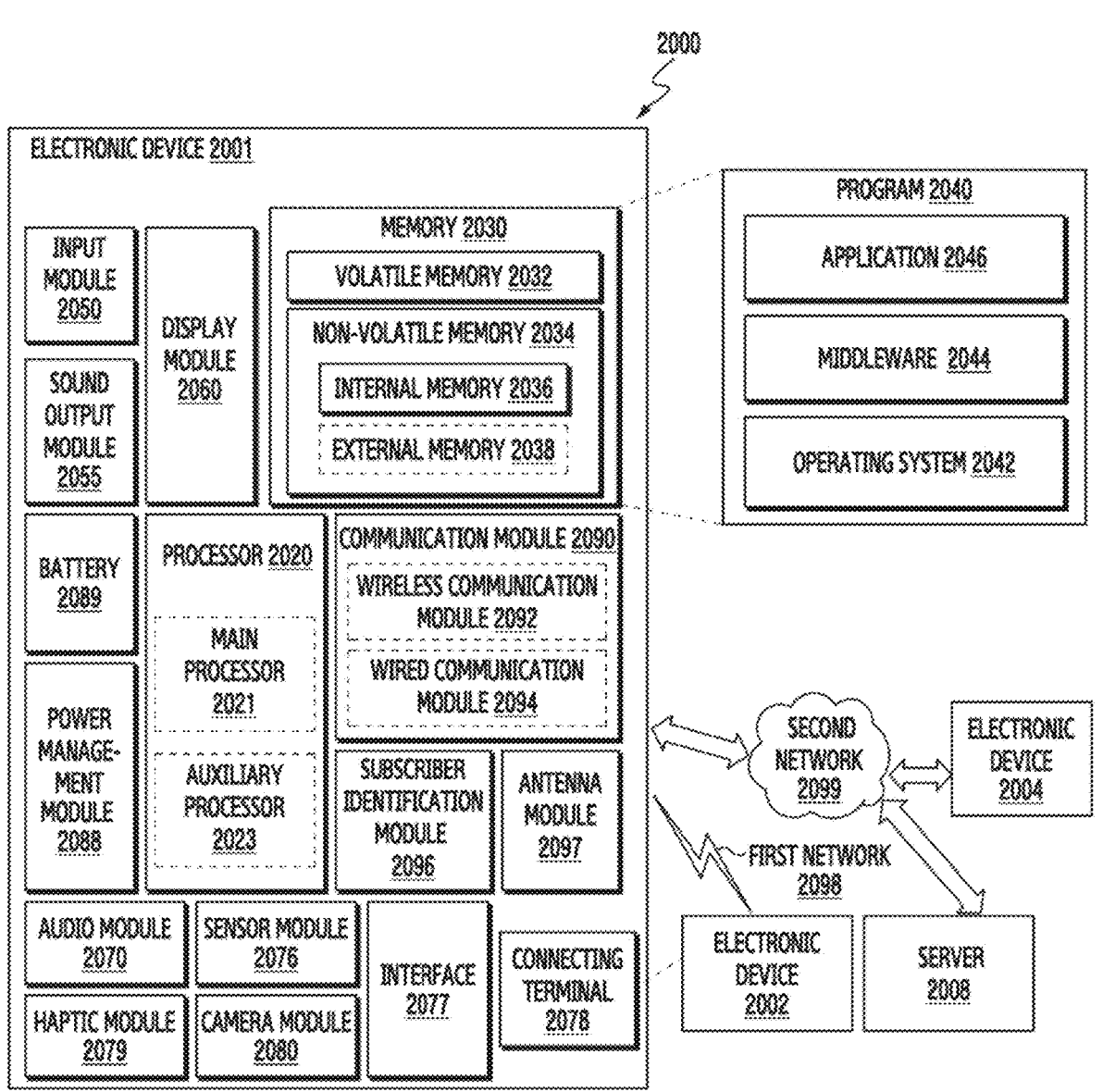
FIG. 20 is a block diagram illustrating an electronic device in a network environment according to various embodiments.

According to one or more embodiments, the electronic device 100 may include at least one or more of a display 120, an audio module (e.g., a sound output module 2055 and/or an audio module 2070 of FIG. 20), a sensor module 111, key input devices 102, 103, and 104, and a connector hole 109. In some embodiments, the electronic device 100 may omit at least one of the components (e.g., the key input devices 102, 103, and 104, the connector hole 109, or the sensor module 111) or may additionally include another component.

The display 120 may be exposed, for example, through a significant portion of the front plate 101. The shape of the display 120 may correspond to a shape of the front plate 101 and may be various shapes such as circular, oval, or polygonal. The display 120 may be coupled to or disposed adjacent to a touch detection circuit, a pressure sensor capable of measuring the intensity (pressure) of a touch, and/or a fingerprint sensor.

The audio module may include a microphone hole 105 and a speaker hole 108. A microphone for obtaining an external sound may be disposed inside the microphone hole 105. The microphone may include a plurality of microphones to be detectable a direction of sound, but is not limited thereto. The speaker hole 108 may be used as an external speaker and a receiver for calls. In some embodiments, the speaker hole 108 may be integrated into the microphone hole 105 so that the speaker hole 108 and the microphone hole 105 may be implemented as one hole, or a speaker may be included without the speaker hole 108 (e.g., a piezo speaker).

The sensor module 111 may generate an electrical signal or data value corresponding to an internal operating state of the electronic device 100 or an external environmental state. The sensor module 111 may include, for example, a sensor module 111 (e.g., a heart rate monitor (HRM) sensor) disposed on the rear surface 110B of the housing 110. The electronic device 100 may further include at least one of a sensor module, for example, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor.

In one or more embodiments, the key input devices 102, 103, and 104 may include a wheel key 102 disposed on the front surface 110A of the housing 110 and rotatable in at least one direction and/or key buttons 104 and 103 disposed on the side surface 110C of the housing 110. For example, the wheel key 102 may have a shape that corresponds to the shape of the front plate 101. In another embodiment, the electronic device 100 may not include a portion or all of the above-described key input devices 102, 103, and 104. For example, the electronic device 100 may not include the wheel key 102. In one or more embodiments, the wheel key 102, which is not included, may be implemented in other forms such as a soft key on the display 120.

The connector hole 109 may accommodate a connector (e.g., a USB connector) for transmitting and receiving power and/or data to and from an external electronic device. The electronic device 100 may further include, for example, a connector cover that covers at least a portion of the connector hole 109 and blocks an inflow of external foreign substances into the connector hole. In another embodiment, the electronic device 100 may not include the connector hole 109, and in this case, the electronic device 100 may transmit and receive power and/or data to and from the external electronic device by using wireless communication.

In one or more embodiments, the fastening members 150 and 160 may be detachably bound to at least some areas of the housing 110 by using locking members 151 and 161. For example, the fastening members 150 and 160 may include at least one of a fixing member 152, a fixing member fastening hole 153, a band guide member 154, and a band fixing ring 155.

In one or more embodiments, the fixing member 152 may be configured to fix the housing 110 and the fastening members 150 and 160 to a portion of the user's body (e.g., wrist and so on). The fixing member fastening hole 153 may fix the housing 110 and the fastening members 150 and 160 to a portion of the user's body in response to the fixing member 152. The band guide member 154 may allow the fastening members 150 and 160 to be tightly bound to a portion of the user's body by being configured to limit a movement range of the fixing member 152 when the fixing member 152 is fastened to the fixing member fastening hole 153. The band fixing ring 155 may limit the movement range of the fastening members 150 and 160 in a state in which the fixing member 152 and the fixing member fastening hole 153 are fastened.

Figure 3:
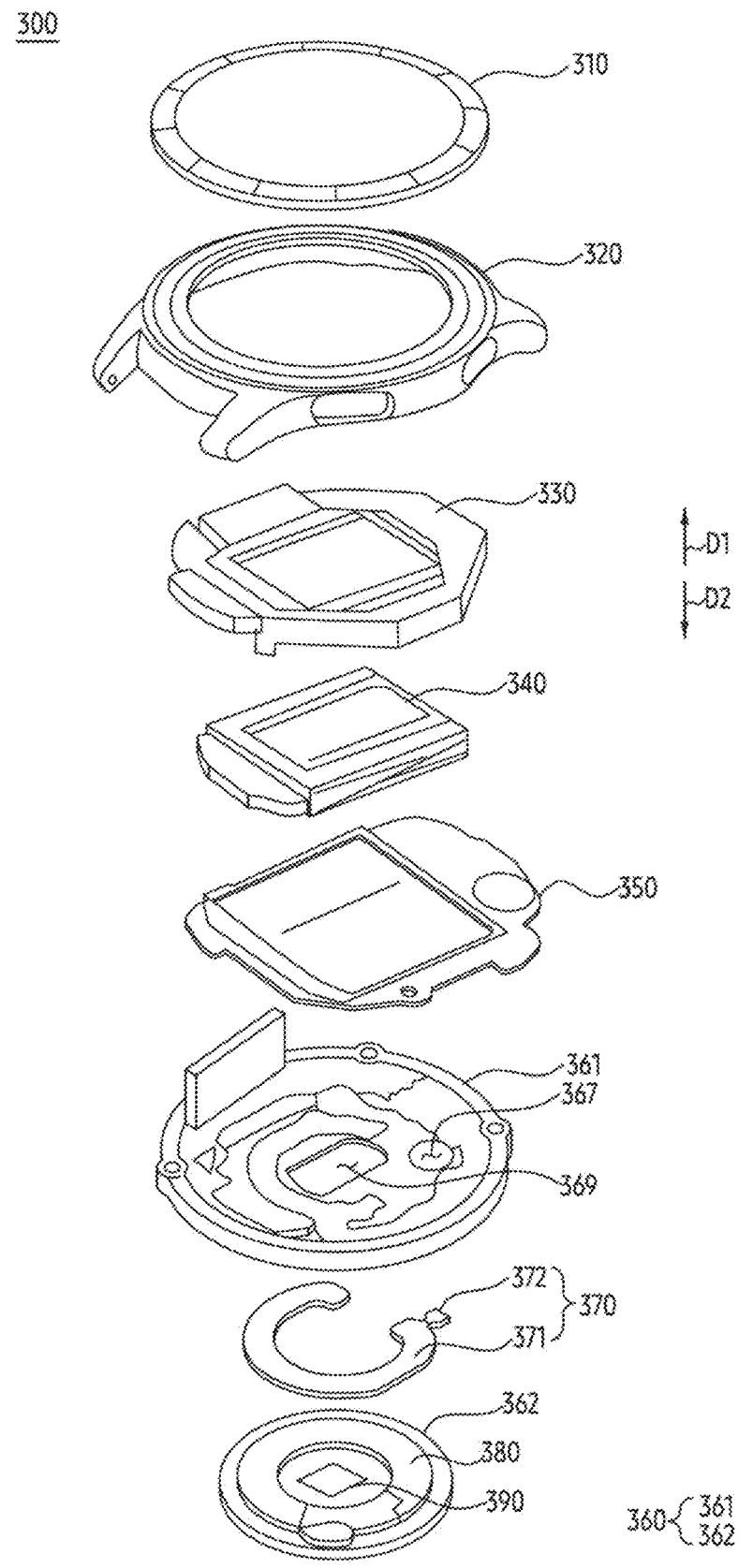
FIG. 3 is an exploded perspective view of an electronic device according to one or more embodiments.

FIG. 3 is an exploded perspective view of an electronic device according to one or more embodiments. An illustrated first direction D1 may be substantially perpendicular to a display 310 and may be a direction from the display 310 toward a cover 360. A second direction D2 may be a direction opposite to the first direction D1. Hereinafter, an overlapping description of configurations having the same reference numerals as the preceding configurations may be omitted.

Referring to FIG. 3, an electronic device 300 (e.g., the electronic device 100 of FIG. 1) according to one or more embodiments may include the display 310, a frame 320 (e.g., the frame 106 of FIG. 1), a printed circuit board 350, the cover 360 (e.g., the rear plate 107 of FIG. 2), a conductive member 370, a wireless charging module 380, and/or a biometric sensor module 390 (e.g., the sensor module 111 of FIG. 2).

In one or more embodiments, the display 310 may be disposed on one side (e.g., the first direction D1) of the frame 320. The display 310 may be coupled to the frame 320. The display 310 may be at least partially accommodated within the frame 320. For example, the display 310 may include a cover (e.g., the front plate 101 of FIG. 1) that forms an exterior (e.g., the front surface 110A of FIG. 1) of the electronic device 300, a display panel (e.g., the display 120 of FIG. 1) disposed under the cover, and a connection member (e.g., a connection member 312 of FIG. 7B) that connects the display panel to the printed circuit board 350.

In one or more embodiments, the frame 320 may be disposed between the display 310 and the cover 360. The frame 320 may form a space in which a component of the electronic device 300 is disposed by surrounding a space between the display 310 and the cover 360. The frame 320 may be at least partially formed of a conductive material. For example, the frame 320 may be formed entirely of a conductive material (e.g., metal), and in this case, the frame 320 may be referred to as a metal frame. For another example, the frame 320 may include a conductive portion (e.g., a conductive portion 1624 of FIG. 16) and a non-conductive portion (e.g., a non-conductive portion 1622 of FIG. 16). The metal frame or the conductive portion may be used as an antenna radiator for transmitting and receiving a radio frequency (RF) signal.

In one or more embodiments, a bracket 330 may be disposed inside the frame 320. For example, the bracket 330 may be positioned between the display 310 and the printed circuit board 350. For example, the display 310 may be disposed on one surface (e.g., a surface facing the first direction D1) of the bracket 330, and the printed circuit board 350 may be disposed on another surface (e.g., a surface facing the second direction D2). The bracket 330 may support the display 310 and the printed circuit board 350. The bracket 330 may be formed of a metal material and/or a non-metal material (e.g., polymer).

In one or more embodiments, a battery 340 may include, for example, a rechargeable secondary battery as a device for supplying power to at least one component of the electronic device 300. For example, the battery 340 may be accommodated in a recess formed in the bracket 330. The recess may be formed, for example, on a surface of the bracket 330 facing the printed circuit board 350.

In one or more embodiments, the printed circuit board 350 may be disposed between the bracket 330 and a first cover 361. The printed circuit board 350 may be supported by the bracket 330. For example, a processor (e.g., a processor 2020 of FIG. 20), a memory (e.g., a memory 2030 of FIG. 20), a wireless communication circuit (e.g., a wireless communication module 2092 of FIG. 20), and/or an interface (e.g., an interface 2077 of FIG. 20) may be disposed on the printed circuit board 350. The processor may include, for example, one or more of a central processing unit, an application processor, a graphic processing unit (GPU), an application processor, a sensor processor, or a communication processor. The memory may include, for example, volatile memory or non-volatile memory. The interface may include, for example, a high definition multimedia interface (HDMI), a universal serial bus (USB) interface, an SD card interface, and/or an audio interface. The wireless communication circuit may transmit or receive the RF signal by using the frame 320. The interface may electrically or physically connect the electronic device 300 to an external electronic device, for example, and may include a USB connector, an SD card/MMC connector, or an audio connector.

In one or more embodiments, the cover 360 may be coupled below (e.g., the second direction D2) the frame 320 to close the internal space of the frame 320. The cover 360, the frame 320, and the display 310 that form the exterior of the electronic device 300 may be referred to as the housing (e.g., the housing 110 of FIG. 1) of the electronic device 300.

In one or more embodiments, the cover 360 may include the first cover 361 and a second cover 362. The first cover 361 may be disposed between the frame 320 and the second cover 362. A first hole 367 and a second hole 369 may be formed in the first cover 361. In one or more embodiments, the second cover 362 may be disposed below (e.g., the second direction D2) the first cover 361. The second cover 362 may cover the first hole 367 and the second hole 369 of the first cover 361. The first cover 361 and/or the second cover 362 may be formed of metal, plastic, glass, or a combination thereof, but is not limited thereto.

In one or more embodiments, the conductive member 370 may be disposed between the printed circuit board 350 and the wireless charging module 380. For example, the conductive member 370 may include a first portion 371 disposed between the first cover 361 and the wireless charging module 380, and a second portion 372 extending from the first portion 371 through the first hole 367 to the printed circuit board 350. For example, the first portion 371 of the conductive member 370 may be attached to the first cover 361 and/or the wireless charging module 380. In one or more embodiments, the conductive member 370 may be at least partially formed of a conductive material. For example, the conductive member 370 may include a conductive pattern formed on a carrier using laser direct structuring (LDS), a conductive pattern of a flexible printed circuit board, a conductive material deposited or plated on a substrate, a conductive metal sheet, a conductive metal film, or a conductive metal foil. In one or more embodiments, the conductive member 370 may be formed to be at least partially bendable. For example, the second portion 372 of the conductive member 370 may be formed to be bendable. The conductive member 370 may be referred to as a conductor.

In one or more embodiments, the wireless charging module 380 configured to transmit and receive a power signal to and from an external device may be disposed between the first cover 361 and the second cover 362. The wireless charging module 380 may be disposed between the conductive member 370 and the second cover 362. The wireless charging module 380 may be disposed on the second cover 362 (e.g., the first direction D1). For example, the wireless charging module 380 may be attached on the second cover 362. For example, the wireless charging module 380 may surround the biometric sensor module 390 on the second cover 362.

In one or more embodiments, the biometric sensor module 390 may be disposed between the first cover 361 and the second cover 362. The biometric sensor module 390 may be disposed on the second cover 362 (e.g., the first direction D1). The biometric sensor module 390 may be partially accommodated in the second hole 369. The biometric sensor module 390 may detect biometric information of the user through the second cover 362 by being disposed to face the second cover 362. For example, the biometric sensor module 390 may detect a biometric signal with respect to the user's body in contact with the second cover 362. For example, the biometric sensor module 390 may include an optical sensor and/or an ultrasonic sensor for detecting heart rate and/or oxygen saturation, but is not limited thereto. In case that the biometric sensor module 390 includes the optical sensor, the second cover 362 may be at least partially formed of a material (e.g., transparent resin or glass) capable of transmitting light.

Figure 4:
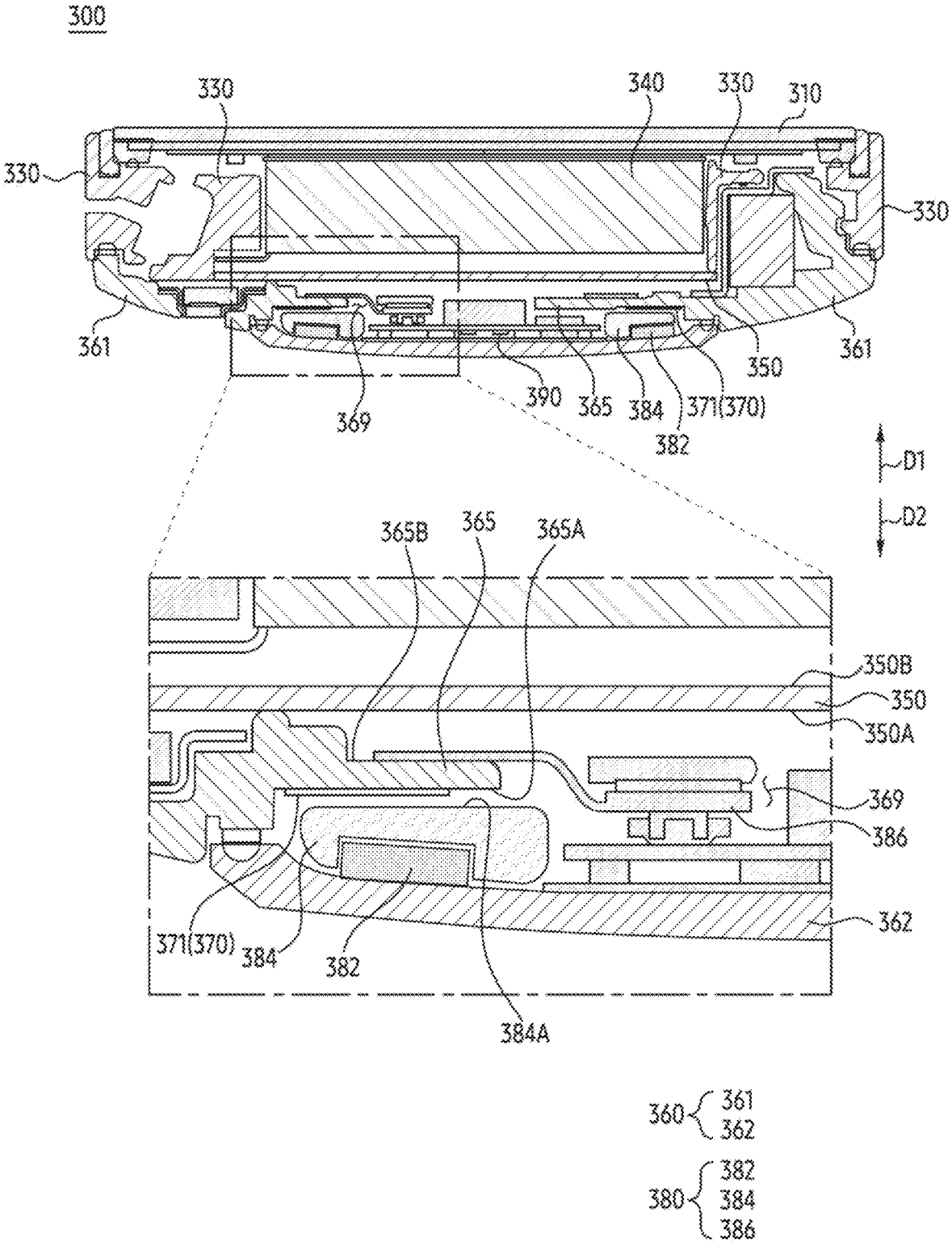
FIG. 4 is a cross-sectional view of an electronic device according to one or more embodiments.
Figure 5:
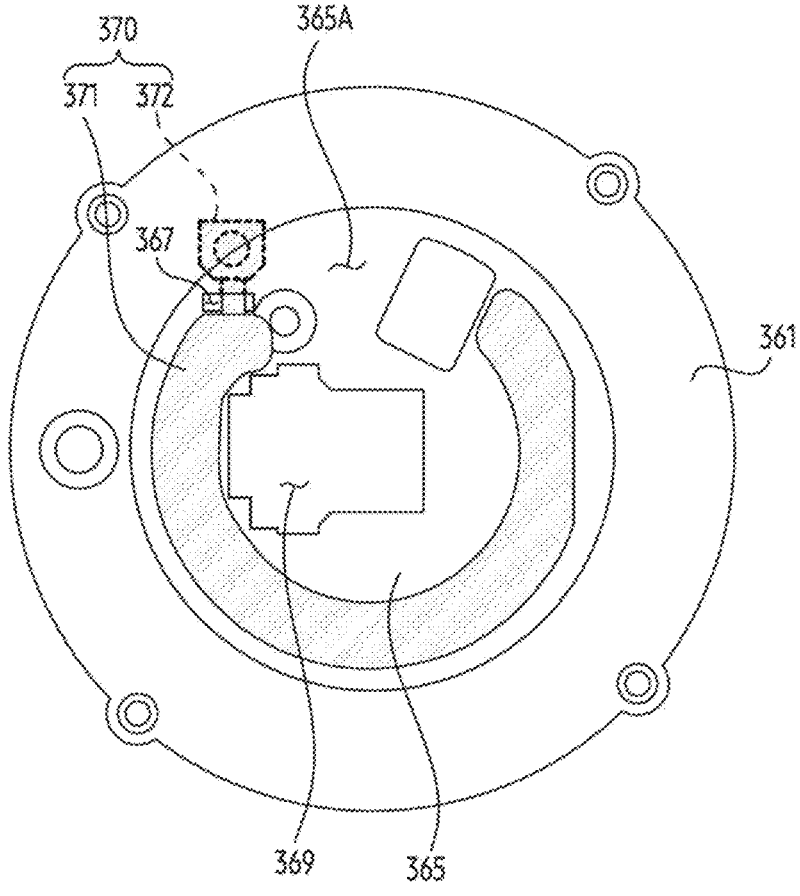
FIG. 5 illustrates a conductive member according to one or more embodiments.
Figure 6:
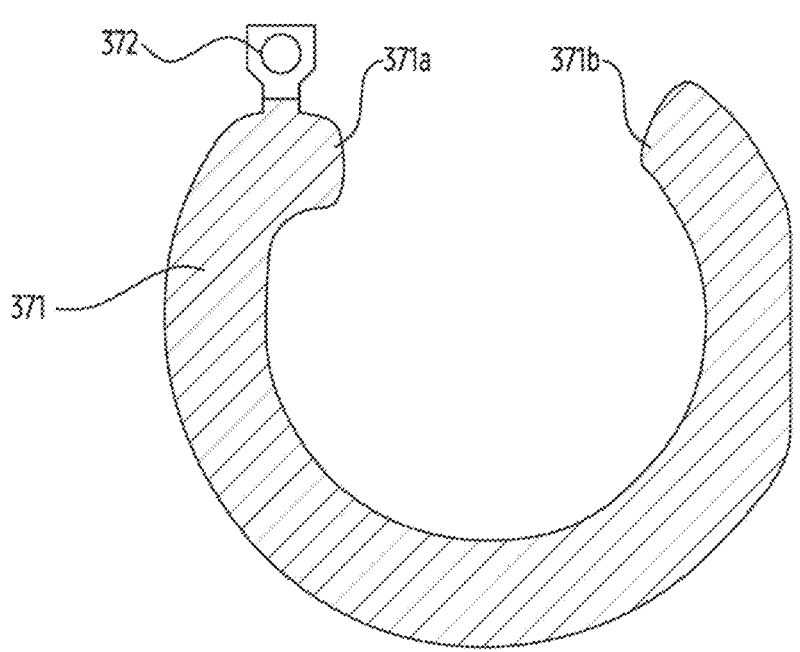
FIG. 6 illustrates a first cover on which an conductive member is disposed according to one or more embodiments.

FIG. 4 is a cross-sectional view of an electronic device according to one or more embodiments. FIG. 5 illustrates a conductive member according to one or more embodiments. FIG. 6 illustrates a first cover on which a conductive member is disposed according to one or more embodiments.

Referring to FIG. 4, in one or more embodiments, a printed circuit board 350 may include a first surface 350A and a second surface 350B. The first surface 350A may face a conductive member 370 (e.g., the second direction D2). The second surface 350B may be opposite to the first surface 350A and may face a display 310 (e.g., the first direction D1). The first surface 350A of the printed circuit board 350 may be supported by a first cover 361.

In one or more embodiments, a wireless charging module 380 may include a wireless charging coil 382, a shielding member 384, and/or a connection member 386. The wireless charging coil 382 may generate a current induced from a magnetic field generated by a transmission coil of an external device. The shielding member 384 may improve power transmission and reception efficiency by concentrating the magnetic field to the wireless charging coil 382. For example, the shielding member 384 may be formed of a magnetic material to shield the magnetic field. For example, the shielding member 384 may be formed of ferrite, but is not limited thereto.

In one or more embodiments, the wireless charging coil 382 may be supported by the second cover 362. The wireless charging coil 382 may be disposed on the second cover 362 (e.g., the first direction D1). For example, the wireless charging coil 382 may be attached on the second cover 362. The shielding member 384 may be disposed on the second cover 362 to cover the wireless charging coil 382. The shielding member 384 may include a first surface 384A facing the conductive member 370 (e.g., the first direction D1). In one or more embodiments, the connection member 386 may connect the wireless charging coil 382 to the printed circuit board 350. For example, a positive electrode and a negative electrode of the wireless charging coil 382 may be electrically connected to the wireless charging circuit on the printed circuit board 350 through a first wiring and a second wiring of the connection member 386. The wireless charging circuit may include a rectifier that converts an alternating current transmitted through the first wiring and the second wiring into a direct current, a regulator that constantly limits the rectified output, or a charging circuit that supplies the output of the regulator to a battery 340. For example, the connection member 386 may extend from the wireless charging coil 382 to the printed circuit board 350 by passing through a second hole 369 of the first cover 361. For example, the connection member 386 may include a flexible printed circuit board.

Referring to FIGS. 4 and 5, in one or more embodiments, the first cover 361 may include a support portion 365. For example, the support portion 365 may be located at a center portion of the first cover 361. For example, the support portion 365 may include a first surface 365A facing the second cover 362 (e.g., the second direction D2) and a second surface 365B opposite the first surface 365A and facing the printed circuit board 350 (e.g., the first direction D1). In one or more embodiments, a first hole 367 or a second hole 369 may be formed in the support portion 365. For example, the first hole 367 and the second hole 369 may penetrate the support portion 365, respectively.

In one or more embodiments, the second cover 362 may cover the support portion 365 of the first cover 361. Since the second cover 362 covers the support portion 365 of the first cover 361, the support portion 365 may not be exposed to the outside.

Referring to FIGS. 4, 5, and 6, in one or more embodiments, the conductive member 370 may be disposed between the printed circuit board 350 and the wireless charging coil 382. For example, the first portion 371 of the conductive member 370 may be disposed between the support portion 365 of the first cover 361 and the wireless charging coil 382. For example, the first portion 371 may be parallel to the printed circuit board 350. For example, the first portion 371 may face the wireless charging coil 382. For example, the first portion 371 may face the wireless charging coil 382 face-to-face. For example, based on a direction (e.g., the first direction D1) perpendicular to the printed circuit board 350, the first portion 371 of the conductive member 370 may overlap the wireless charging coil 382. In one or more embodiments, the first portion 371 and the wireless charging coil 382 may be formed in substantially the same or similar size and/or shape as each other so that an area facing each other is as large as possible, but is not limited thereto.

In one or more embodiments, the conductive member 370 may be spaced apart from the wireless charging coil 382. For example, the first portion 371 of the conductive member 370 may be spaced apart from the wireless charging coil 382. In one or more embodiments, the first portion 371 of the conductive member 370 may be attached on the support portion 365 of the first cover 361 and/or the shielding member 384. For example, the first portion 371 of the conductive member 370 may be attached on the first surface 365A of the support portion 365 and/or the first surface 384A of the shielding member 384.

In one or more embodiments, the conductive member 370 may be partially spaced apart from the printed circuit board 350. For example, the first portion 371 of the conductive member 370 may be spaced apart from the printed circuit board 350.

In one or more embodiments, the first portion 371 may have a ring shape that extends roundly along the circumference of the second cover 362 (or the wireless charging coil 382) when viewed from above (e.g., when viewed in the first direction D1, or from an above view of the PCB). For example, the first portion 371 may have an open ring shape in some sections so that both ends (i.e. two ends) 371a and 371b of the ring are formed. However, the shape of the conductive member 370 is not limited to the illustrated example. Various shapes of the conductive member 370 will be described later with reference to FIG. 18.

In one or more embodiments, the second portion 372 may extend from the first portion 371 to the printed circuit board 350. For example, the second portion 372 may extend from the first end 371a of the first portion 371. In one or more embodiments, the second portion 372 may penetrate the first cover 361. For example, the second portion 372 may pass through the first hole 367 of the first cover 361. The second portion 372 may electrically connect the first portion 371 to the printed circuit board 350.

Figure 7A:
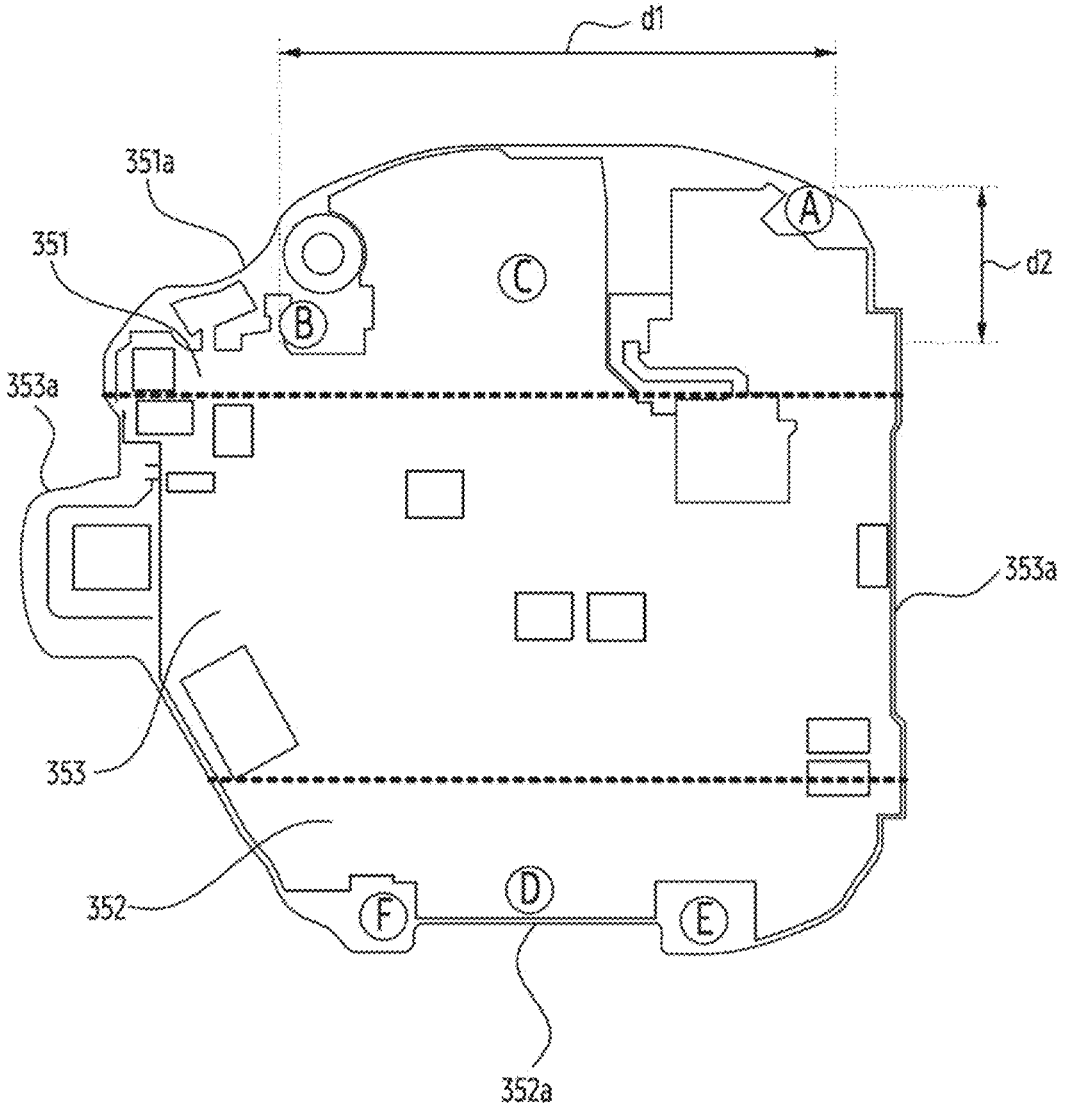
FIG. 7A is a diagram illustrating a printed circuit board according to one or more embodiments.

FIG. 7A is a diagram illustrating a printed circuit board according to one or more embodiments. Referring to FIG. 7A, a printed circuit board 350 may include a first point A, a second point B, a third point C, a fourth point D, a fifth point E, and/or a sixth point F. For example, each of the first point A, the second point B, the third point C, the fourth point D, the fifth point E, and/or the sixth point F may be a point or area located on a first surface 350A or a second surface 350B of the printed circuit board 350.

In one or more embodiments, the printed circuit board 350 may include a first portion 351, a second portion 352, and/or a third portion 353. The first portion 351 may include a first part 351a of a periphery of the printed circuit board 350. The second portion 352 may include a second part 352a of the periphery of the printed circuit board 350. For example, the second part 352a may be located opposite the first part 351a. The second portion 352 may be spaced apart from the first portion 351. The third portion 353 may include a remaining part 353a of the periphery of the printed circuit board 350. For example, the third portion 353 may be formed between the first portion 351 and the second portion 352. The third portion 353 may extend from the first portion 351 to the second portion 352. The periphery of the printed circuit board 350 may include the first part 351a, the second part 352a, and the remaining part 353a.

In one or more embodiments, the first point A, the second point B, and the third point C may be located on the first portion 351 of the printed circuit board 350. The fourth point D, the fifth point E, and the sixth point F may be located on the second portion 352 of the printed circuit board 350. In one or more embodiments, the wireless communication circuit and a shielding member (e.g., a shield can) covering the wireless communication circuit may be disposed on the third portion 353 of the printed circuit board 350. The shielding member may not be located on the first portion 351 and the second portion 352 of the printed circuit board 350.

In one or more embodiments, a first area (e.g., the second portion 352) having the fourth point D connected to a display 310 and the printed circuit board 350, and a second area (e.g., the first portion 351) having the second point B connected to a conductive member 370 and the printed circuit board 350 may be areas facing each other. For example, the first area may be an area where the fourth point D is located, and the second area may be an area where the second point B is located. By locating the second point B and the fourth point D to be as far apart as possible from the printed circuit board 350, an electrical length of antenna ground may be lengthened.

Based on FIG. 7A, in one or more embodiments, the third point C may be located between the first point A and the second point B. The second point B may be closer to the first point A than the fourth point D, the fifth point E, and the sixth point F. The third point C may be closer to the first point A than the fourth point D, the fifth point E, and the sixth point F.

In one or more embodiments, based on one direction, a distance d1 between the first point A and the second point B may be about 15 mm or more, but is not limited thereto. Based on a direction perpendicular to the one direction, a distance d2 between the first point A and the second point B may be less than about 5 mm, but is not limited thereto.

Figure 7B:
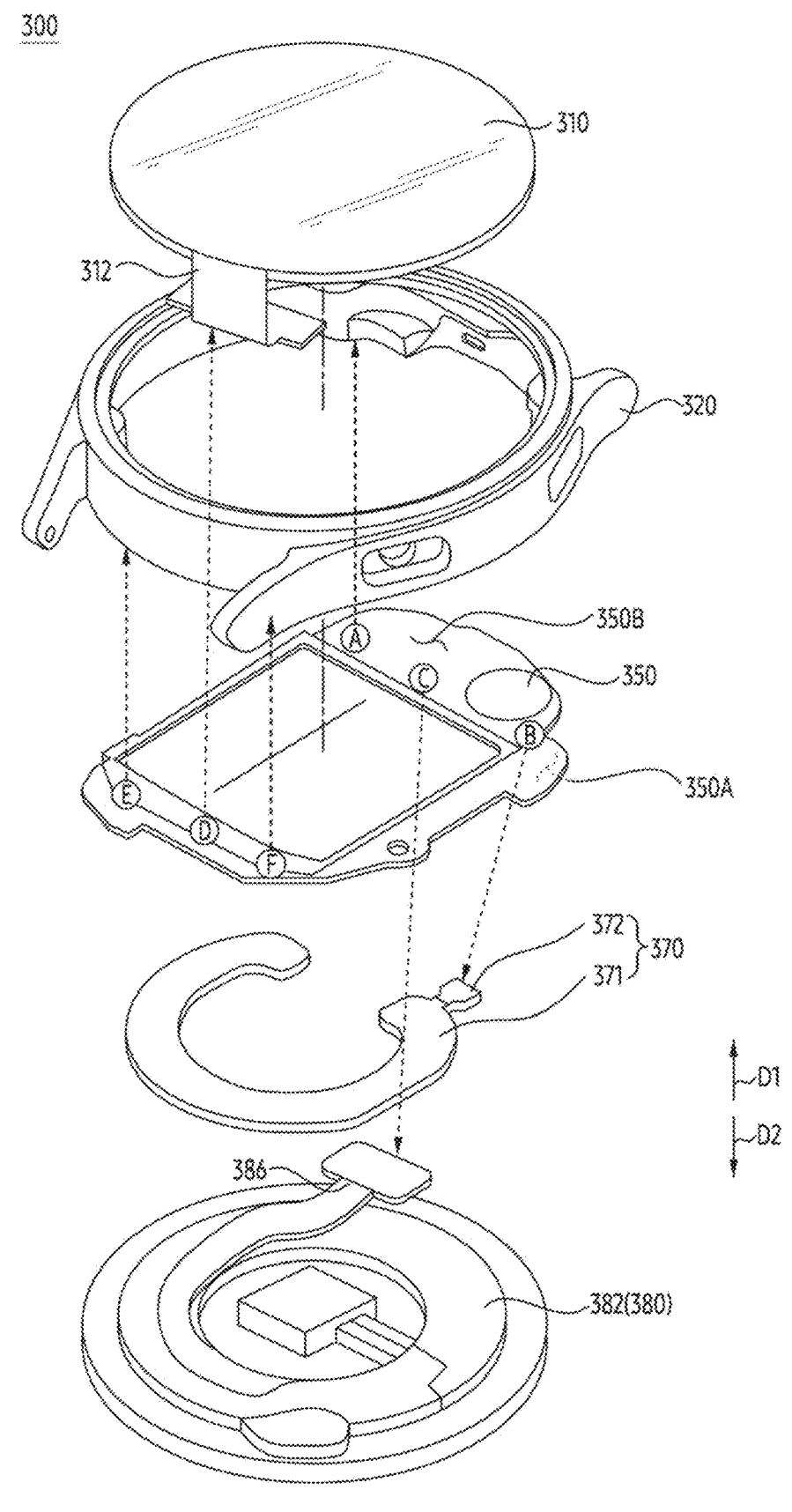
FIG. 7B is a diagram illustrating an electrical connection relationship of an electronic device according to one or more embodiments.
Figure 8:
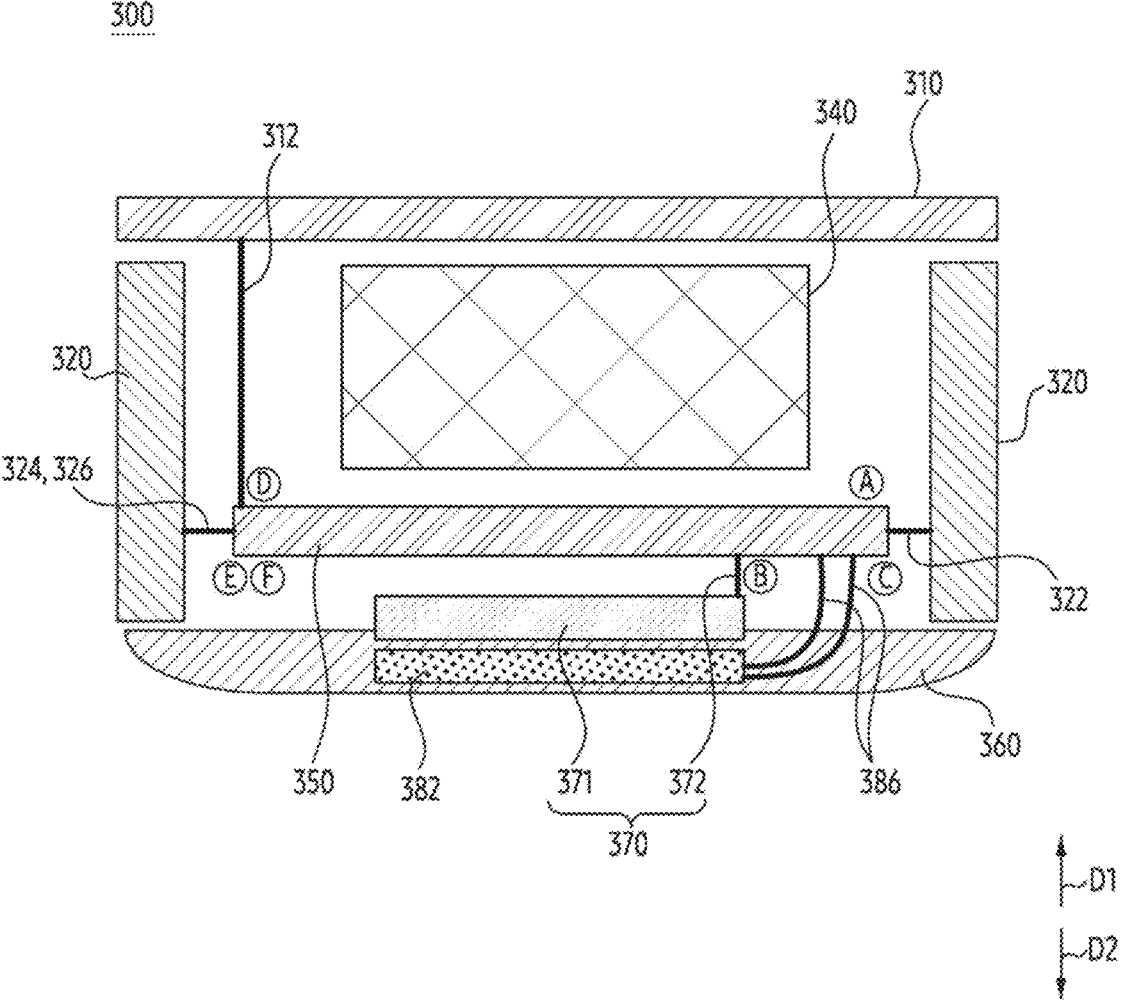
FIG. 8 is a diagram illustrating an electronic device according to one or more embodiments.

FIG. 7B is a diagram illustrating an electrical connection relationship of an electronic device according to one or more embodiments. FIG. 8 is a diagram illustrating an electronic device according to one or more embodiments. Referring to FIGS. 7B and 8 together with FIG. 7A, in one or more embodiments, a frame 320 may be connected to a first point A, a fifth point E, and a sixth point F of a printed circuit board 350. For example, the frame 320 may be electrically connected to the first point A, the fifth point E, and the sixth point F, respectively. Points of the frame 320 connected to the first point A, the fifth point E, and the sixth point F may be different from each other.

In one or more embodiments, the wireless communication circuit disposed on the printed circuit board 350 may feed the frame 320 connected to a first portion 351 of the printed circuit board 350. For example, the wireless communication circuit may feed the frame 320 through the first point A on the first portion 351. A transmission line (or conductive trace) connecting the wireless communication circuit and the first point A may be formed on and/or within the printed circuit board 350. The wireless communication circuit may transmit an RF signal of a first frequency band by feeding the frame 320. The wireless communication circuit may receive the RF signal of the first frequency band by using the frame 320. The first frequency band may include, for example, a low-band of about 300 MHz to 1,000 MHz, but is not limited thereto. In one or more embodiments, a connection 322 between the first point A and the frame 320 may be formed, for example, by the frame 320 contacting a connector (e.g., a C-clip connector) disposed on the first point A, but is not limited thereto. Additionally or optionally, an electronic device 300 may include a matching circuit connected between the first point A and the wireless communication circuit for impedance matching.

In one or more embodiments, the frame 320 may be grounded by being connected to a second portion 352 of the printed circuit board 350. For example, the frame 320 may be grounded through the fifth point E and the sixth point F on the second portion 352. For example, the frame 320 may be electrically connected to a ground of the printed circuit board 350 through the fifth point E and/or the sixth point F. For example, the ground may include at least one conductive area formed on the printed circuit board 350. A connection 324 between the fifth point E and the frame 320 may be formed, for example, by the frame 320 contacting a connector (e.g., the C-clip connector) disposed on the fifth point E, but is not limited thereto. A connection 326 between the sixth point F and the frame 320 may be formed, for example, by the frame 320 contacting a connector (e.g., the C-clip connector) disposed on the sixth point F, but is not limited thereto. Optionally, the frame 320 may be grounded at only one point among the fifth point E and the sixth point F.

In one or more embodiments, a conductive member 370 may be connected to the first portion 351 of the printed circuit board 350. For example, the conductive member 370 may be connected to a second point B on the first portion 351. For example, the conductive member 370 may be connected to the printed circuit board 350 by contacting the second portion 372 of the conductive member 370 with a connector (e.g., the C-clip connector) disposed on the second point B, but is not limited thereto. The conductive member 370 may be grounded through the first portion 351 of the printed circuit board 350. For example, the conductive member 370 may be grounded through the second point B on the first portion 351. For example, the conductive member 370 may be electrically connected to the ground of the printed circuit board 350 through the second point B.

In one or more embodiments, a wireless charging coil 382 may be connected to the first portion 351 of the printed circuit board 350. For example, the wireless charging coil 382 may be connected to a third point C on the first portion 351. For example, the wireless charging coil 382 may be connected to the third point C through a connection member 386. For example, the wireless charging coil 382 may be connected to the printed circuit board 350 by coupling a connector (e.g., plug) formed at an end of the connection member 386 to a corresponding connector (e.g., receptacle) disposed on the third point C. The wireless charging coil 382 may be connected to the wireless charging circuit through the first portion 351 of the printed circuit board 350.

In one or more embodiments, in order to prevent a near field loss between the conductive member 370 and the printed circuit board 350, the conductive member 370 may be spaced apart from the printed circuit board 350. For example, the first portion 371 of the conductive member 370 may be spaced apart from the printed circuit board 350 in a second direction D2. For example, based on the second direction D2, a distance to which the first portion 371 of the conductive member 370 and the printed circuit board 350 is spaced apart may be about 1 mm or more, but is not limited thereto.

In one or more embodiments, the first portion 371 of the conductive member 370 and the wireless charging coil 382, which are spaced apart from each other and facing each other, may be coupled. For example, a ground area of an antenna may be expanded by coupling the conductive member 370 and the wireless charging coil 382. The conductive member 370 may be electromagnetically connected to the wireless charging coil 382. For example, the conductive member 370 and the wireless charging coil 382 may be capacitively coupled and/or inductively coupled. The conductive member 370 and the wireless charging coil 382 may be used as the ground for the antenna that uses at least a portion of the frame 320 as a radiator.

Additionally or optionally, the conductive member 370 and the wireless charging coil 382 may be connected through an element disposed on the printed circuit board 350. For example, wiring of the printed circuit board 350 connected to the conductive member 370 and wiring of the printed circuit board 350 connected to the wireless charging coil 382 may be connected through a capacitor.

In one or more embodiments, a display 310 may be connected to the second portion 352 of the printed circuit board 350. For example, the display 310 may be connected to a fourth point D on the second portion 352. For example, the display 310 may be connected to the fourth point D of the printed circuit board 350 through a connection member 312. For example, the display 310 may be connected to the printed circuit board 350 by coupling a connector (e.g., plug) formed on the connection member 312 with a corresponding connector (e.g., receptacle) disposed on the fourth point D. For example, the connection member 312 may include a flexible printed circuit board. In one or more embodiments, the display 310 may be grounded through the second portion 352 of the printed circuit board 350. For example, a conductive layer included in the display 310 and operating as a ground may be grounded through the fourth point D on the second portion 352. For example, the conductive layer of the display 310 may be electrically connected to the ground of the printed circuit board 350 through the fourth point D. The display 310 (e.g., the conductive layer of a display panel) may be used as the ground for the antenna that uses at least a portion of the frame 320 as a radiator.

Additionally or optionally, the electronic device 300 may include a first plurality of matching circuits and a first switch circuit connected between the second point B of the printed circuit board 350 and the ground. Any one of the first plurality of matching circuits selected through the first switch circuit may electrically connect the conductive member 370, which is connected to the second point B, to the ground of the printed circuit board 350. Through this, impedance matching and/or resonance frequency adjustment may be possible. Antenna characteristics according to the matching circuit connected to the second point B will be described later with reference to FIG. 14.

Additionally or optionally, the electronic device 300 may include a second plurality of matching circuits and a second switch circuit connected between the fifth point E of the printed circuit board 350 and the ground. Any one of the second plurality of matching circuits selected through the second switch circuit may electrically connect the frame 320, which is connected to the fifth point E, to the ground of the printed circuit board 350. Through this, impedance matching and/or resonance frequency adjustment may be possible.

Additionally or optionally, the electronic device 300 may include a third plurality of matching circuits and a third switch circuit connected between the sixth point F of the printed circuit board 350 and the ground. Any one of the third plurality of matching circuits selected through the third switch circuit may electrically connect the frame 320, which is connected to the fifth point E, to the ground of the printed circuit board 350. Through this, impedance matching and/or resonance frequency adjustment may be possible.

A wearable device such as the electronic device 300 is becoming increasingly compact in consideration of wearability, portability, and user preference. Due to the limited size of the wearable device, the ground of the antenna that affects various antenna characteristics such as coverage and bandwidth may also be physically limited. In particular, an antenna that operates in a low-frequency band is essential for data communication, but in general, the small size of the wearable device further limits the implementation of such an antenna in that the lower the resonant frequency, the longer the antenna is required.

Figure 9:
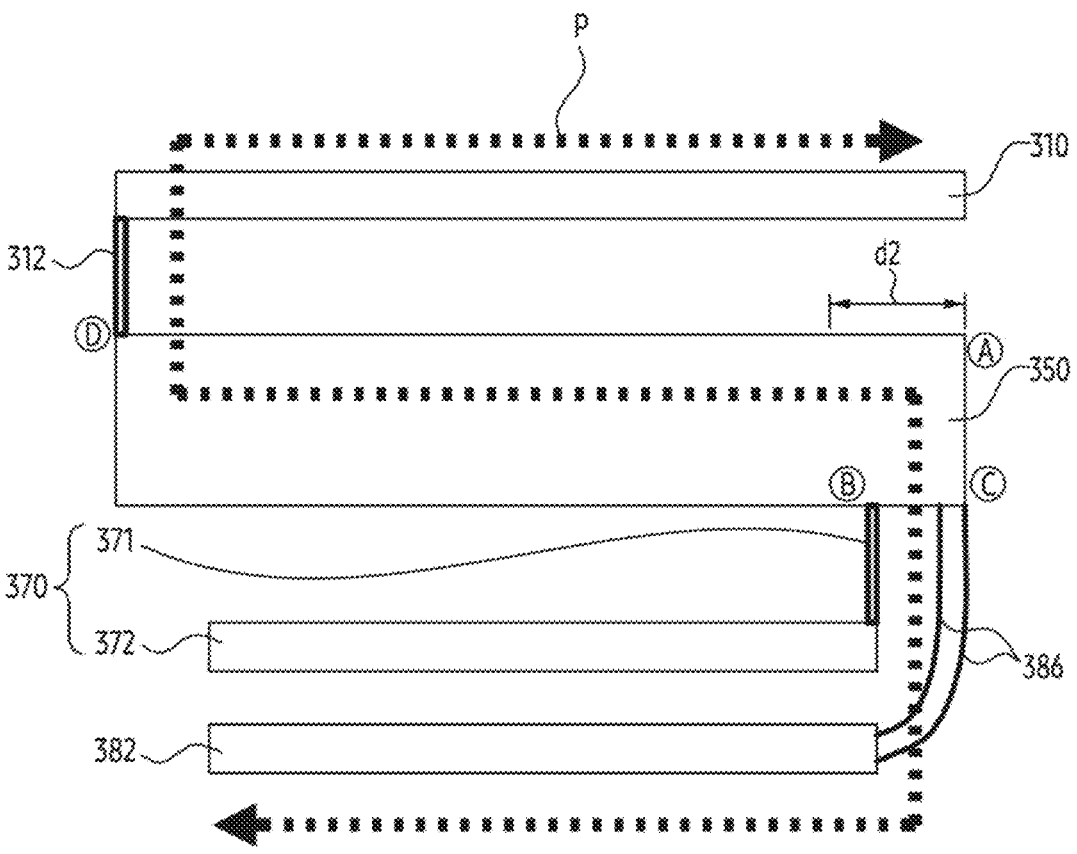
FIG. 9 is a diagram illustrating a current flow of an electronic device, according to one or more embodiments.

FIG. 9 is a diagram illustrating a current flow of an electronic device, according to one or more embodiments. Referring to FIG. 9, when a frame 320 is fed through a first point A, a display 310, a printed circuit board 350, a conductive member 370, and a wireless charging coil 382 may be used as a ground for an antenna that uses at least a portion of the frame 320 as a radiator. For example, when the frame 320 is fed through the first point A, a current path P may flow to the display 310, the printed circuit board 350, the conductive member 370, and the wireless charging coil 382. The display 310 may extend the current path P from the printed circuit board 350. Additionally, the coupled conductive member 370 and the wireless charging coil 382 may extend the current path P from the printed circuit board 350. Through this, bandwidth and radiation efficiency may be improved, by extending the ground of the antenna that uses the frame 320 physically and electrically. Additionally, an electrical length of the antenna for forming a low-band resonant frequency may be secured. The low-band may be about 300 MHz to 1 GHz or less, but is not limited thereto.

In one or more embodiments, the display 310, the printed circuit board 350, the conductive member 370, and the wireless charging coil 382 may form an antenna of an electronic device 300 together with at least a portion of the frame 320 that is fed through the first point A. In one or more embodiments, the display 310, the printed circuit board 350, the conductive member 370, and the wireless charging coil 382 may be used as the ground for the antenna including at least a portion of the frame 320 that is fed through the first point A. In one or more embodiments, the display 310, the printed circuit board 350, the conductive member 370, and the wireless charging coil 382 may be understood as forming antenna radiation by operating as an antenna of the electronic device 300 together with the frame 320 that is fed through the first point A.

In one or more embodiments, an antenna structure that uses the frame 320 may include a structure in which the display 310 used as a ground, the printed circuit board 350, the conductive member 370, and the wireless charging coil 382 are stacked substantially parallel to each other, and a structure in which the display 310 is connected to a fourth point D and the conductive member 370 and the wireless charging coil 382 are connected to a second point B and a third point C. Since these structures increases capacitive loading, the resonant frequency of the antenna that uses the metal frame 320 may be lowered.

In one or more embodiments, the display 310 may be grounded at the fourth point D of the printed circuit board 350, and the frame 320 may be fed at the first point A. In one or more embodiments, the conductive member 370 may be grounded at the second point B. The wireless charging coil 382 may be connected to the printed circuit board 350 at the third point C. Each of the first point A, the second point B, and the third point C may be positioned to be spaced apart from the fourth point D as far as possible. Through this, the current path P of the antenna ground may be lengthened. Accordingly, bandwidth and radiation efficiency may be improved since the ground of the antenna that uses the frame 320 is physically and electrically extended.

In one or more embodiments, as a distance d2 between the first point A and the second point B decreases, antenna performance may improve. This will be described later with reference to FIG. 13.

Figure 10:
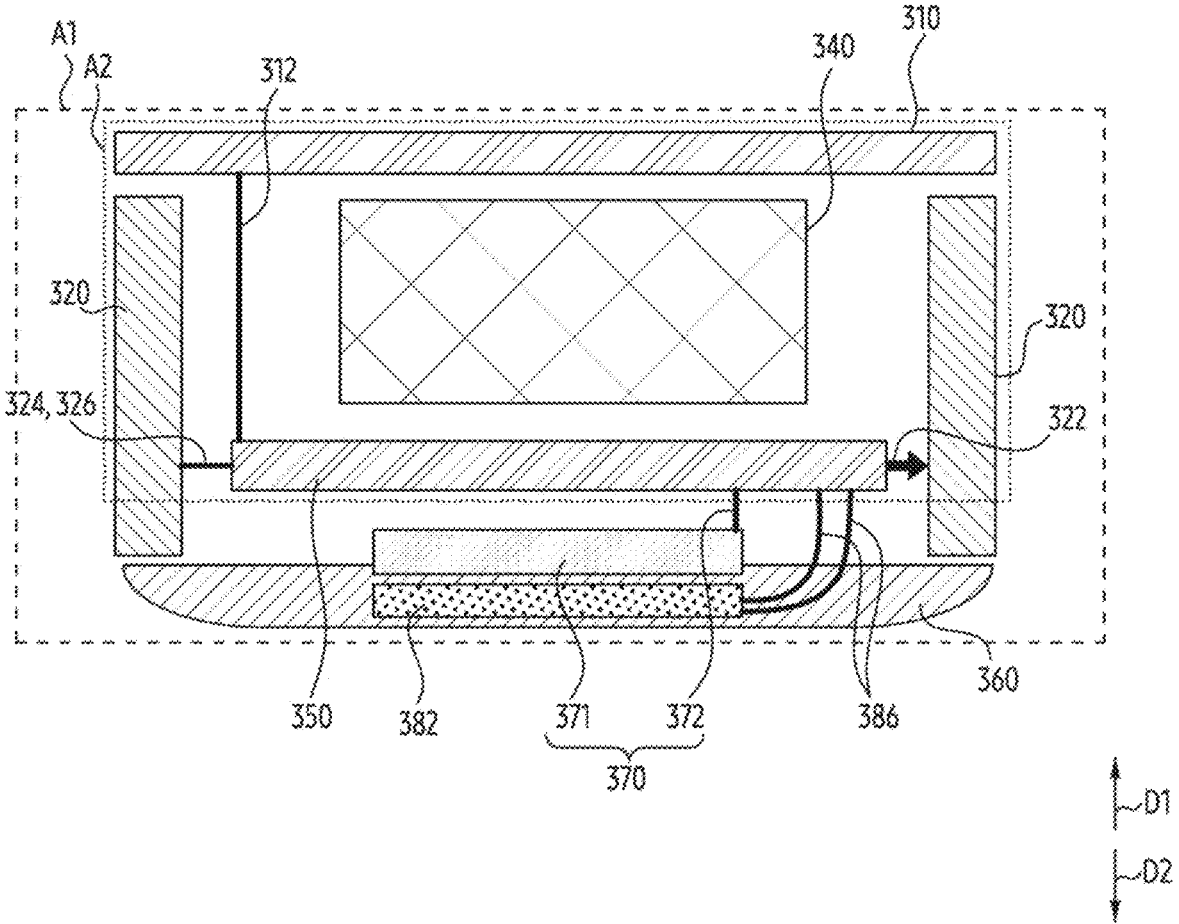
FIG. 10 is a diagram illustrating a radiation effective area of an electronic device, according to one or more embodiments.
Figure 11:
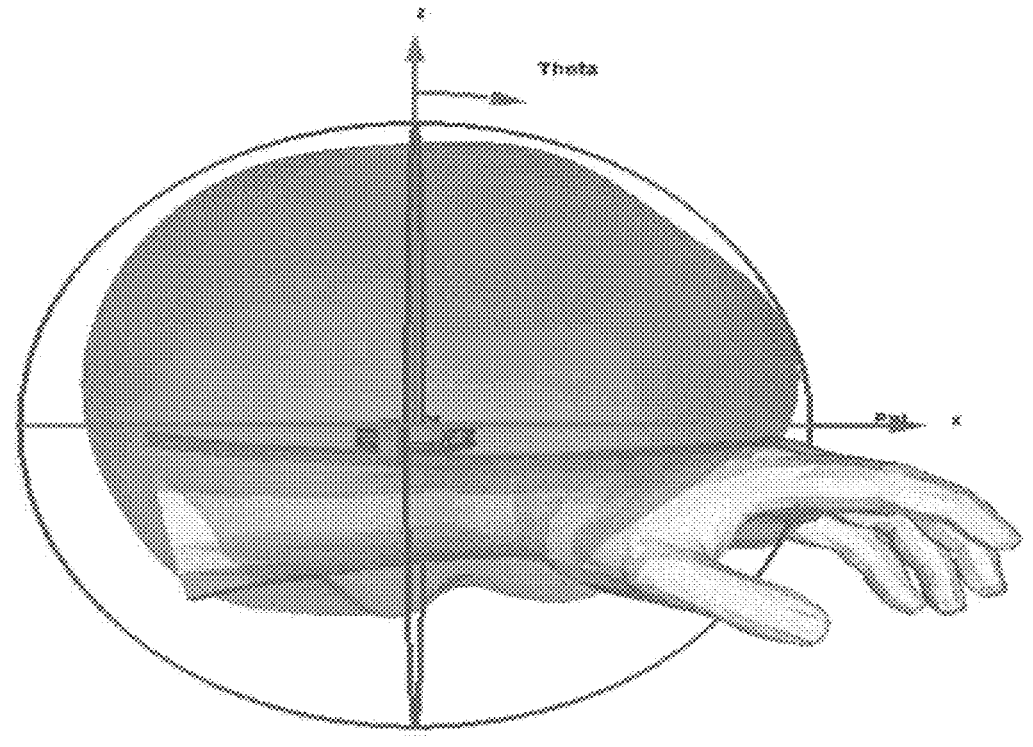
FIG. 11 is a diagram illustrating a radiation pattern of an electronic device, according to one or more embodiments.

FIG. 10 is a diagram illustrating a radiation effective area of an electronic device, according to one or more embodiments. FIG. 11 is a diagram illustrating a radiation pattern of an electronic device, according to one or more embodiments. Referring to FIG. 10, in one or more embodiments, the radiation effective area may be improved by a conductive member 370 coupled to a wireless charging coil 382. For example, in a case that the conductive member 370 is not included, the radiation effective area (or radiation effective volume) of an electronic device 300 may be formed as an area A2 that includes only a display 310, a metal frame 320, and a printed circuit board 350. This may be because the current fed to the frame 320 flows only to the printed circuit board 350 and the display 310. In contrast, the radiation effective area of the electronic device 300 may be extended to an area A1 that includes the display 310, the metal frame 320, the printed circuit board 350, the conductive member 370, the wireless charging coil 382, and a cover 360 on which the wireless charging coil 382 is disposed by coupling the conductive member 370 with the wireless charging coil 382 under the printed circuit board 350.

Referring to FIG. 11 together with FIG. 10, the radiation pattern of the electronic device 300 having the radiation effective area A1 that includes the cover 360 may include a user's body in contact with the cover 360. Antenna performance may be improved by using the user's body in contact with the cover 360 as an antenna element. This may be because the user's body having electrical conductivity faces the conductive member 370 and the wireless charging coil 382 in parallel, so the user's body also operates as a ground (or radiator) for the frame 320. The effect of improving antenna performance according to using the body as an antenna element may be increased as the resonant frequency formed by the antenna is lower. In addition, a distance between the ground and the user's body may be reduced by using the wireless charging coil 382 disposed on the cover 360 in contact with the user's body as a ground of the antenna. Accordingly, antenna performance may be improved by increasing an amount of coupling between the wireless charging coil 382 and the user's body.

Figure 12:
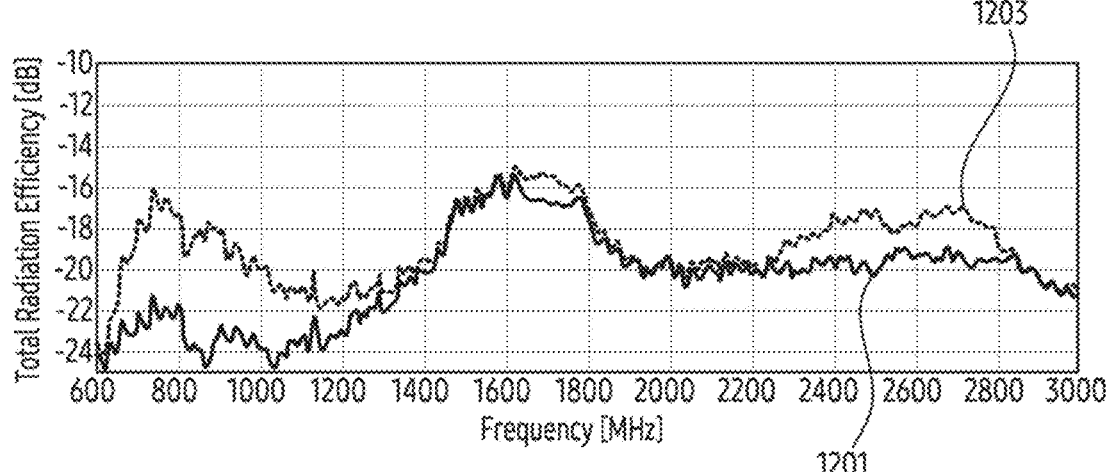
FIG. 12 is a graph illustrating radiation efficiency of an electronic device according to one or more embodiments.

FIG. 12 is a graph illustrating radiation efficiency of an electronic device. A graph 1201 of FIG. 12 represents radiation efficiency of the electronic device according to a comparative embodiment, and a graph 1203 represents radiation efficiency of the electronic device according to one or more embodiments. The electronic device according to the comparative embodiment does not include a conductive member 370. Referring to the graph 1201 and the graph 1203 of FIG. 12, the electronic device according to one or more embodiments may improve radiation efficiency and bandwidth in a first frequency band of about 600 MHz to 1,400 MHz, a second frequency band of about 1,600 MHz to 1,800 MHz, and a third frequency band of about 2,200 MHz to 2,800 MHz compared to the comparative embodiment. For example, antenna performance of the first frequency band may be improved the most significantly, and antenna performance of the third frequency band including a third harmonic component of the first frequency band may also be improved. Accordingly, the performance of the required frequency band may be secured even though an antenna space of an electronic device 300 is limited. In addition, cost may be reduced and mounting space may be saved since the antenna performance may be improved without adding a separate circuit component. By using the saved mounting space as an antenna space for another frequency band, it may be advantageous to secure antenna performance in the other frequency band.

Figure 13:
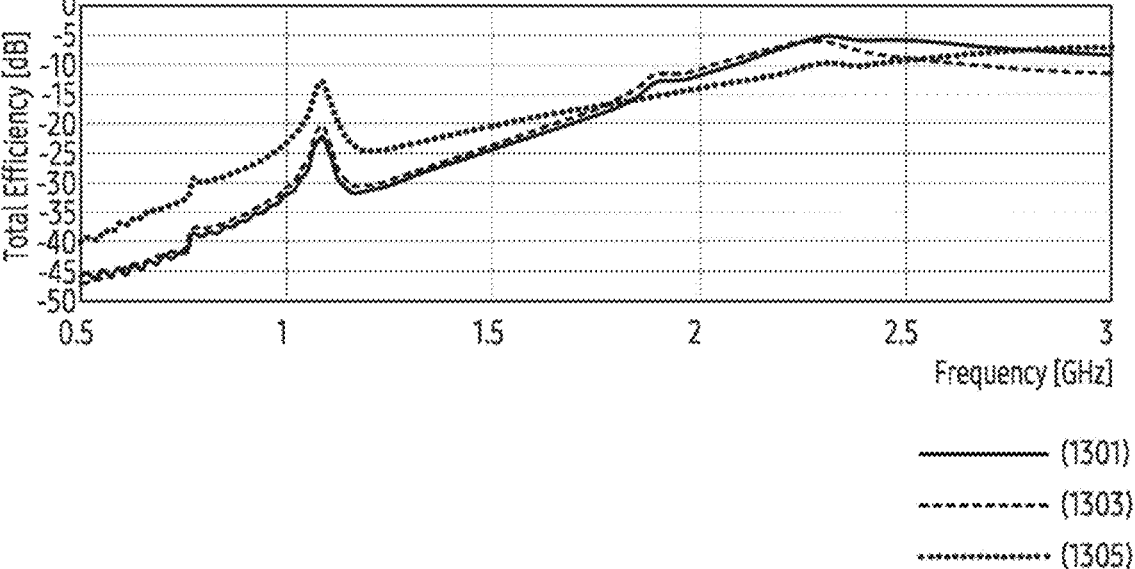
FIG. 13 illustrates radiation efficiency according to a distance between a first point and a second point, according to one or more embodiments.

FIG. 13 illustrates radiation efficiency according to a distance between a first point and a second point, according to one or more embodiments. Referring to FIG. 13 together with FIG. 9, a graph 1301 represents radiation efficiency when a distance d2 between a first point A and a second point B is a first distance. A graph 1303 represents radiation efficiency when the distance d2 between the first point A and the second point B is a second distance smaller than the first distance. A graph 1305 represents radiation efficiency when the distance d2 between the first point A and the second point B is a third distance smaller than the second distance. Referring to the graphs 1301, 1303, and 1305 of FIG. 13, as the distance d2 between the first point A and the second point B decreases, the radiation efficiency may be improved. This may be because a ground expansion effect of an antenna that uses a frame 320 is maximized as the distance d2 between the first point A and the second point B decreases.

Figure 14:
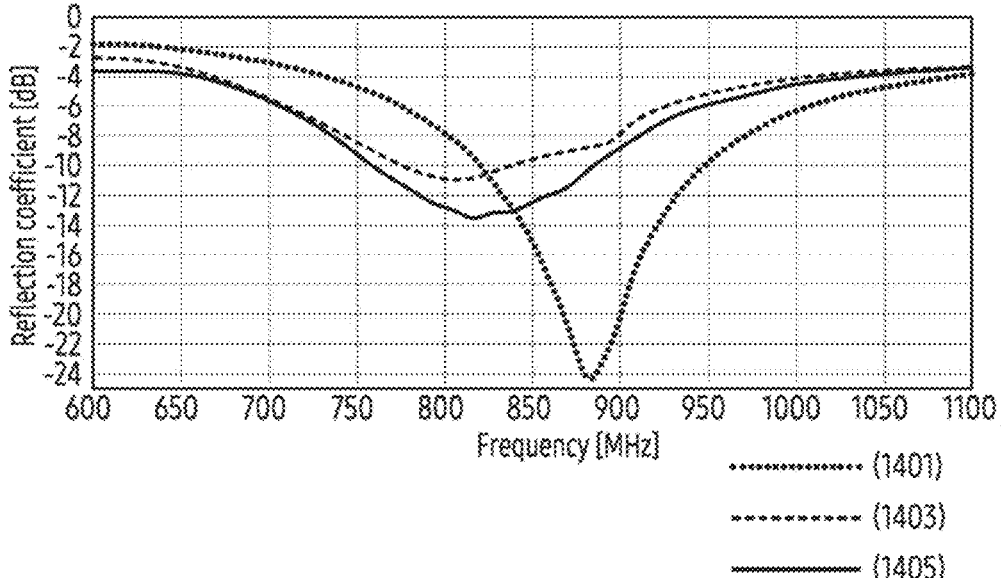
FIG. 14 illustrates a reflection coefficient according to a matching circuit, according to one or more embodiments.

FIG. 14 illustrates a reflection coefficient according to a matching circuit, according to one or more embodiments. Referring to FIG. 8 together, graphs 1401, 1403, and 1405 of FIG. 14 may represent reflection coefficients according to a matching circuit connected to a ground of a conductive member 370 and a printed circuit board 350. The graph 1401 represents the reflection coefficient when the conductive member 370 is connected to a matching circuit having capacitance (e.g., 100 pF). The graph 1403 represents the reflection coefficient when the conductive member 370 is connected to a matching circuit having an inductance of a first magnitude (e.g., 15 nH). The graph 1405 represents the reflection coefficient when the conductive member 370 is connected to a matching circuit having an inductance of a second magnitude (e.g., 33 nH) greater than the first magnitude. As illustrated in FIG. 14, resonant frequency of an antenna that uses a frame 320 may be adjusted by selectively connecting the conductive member 370 to a matching circuit having different values.

Figure 15:
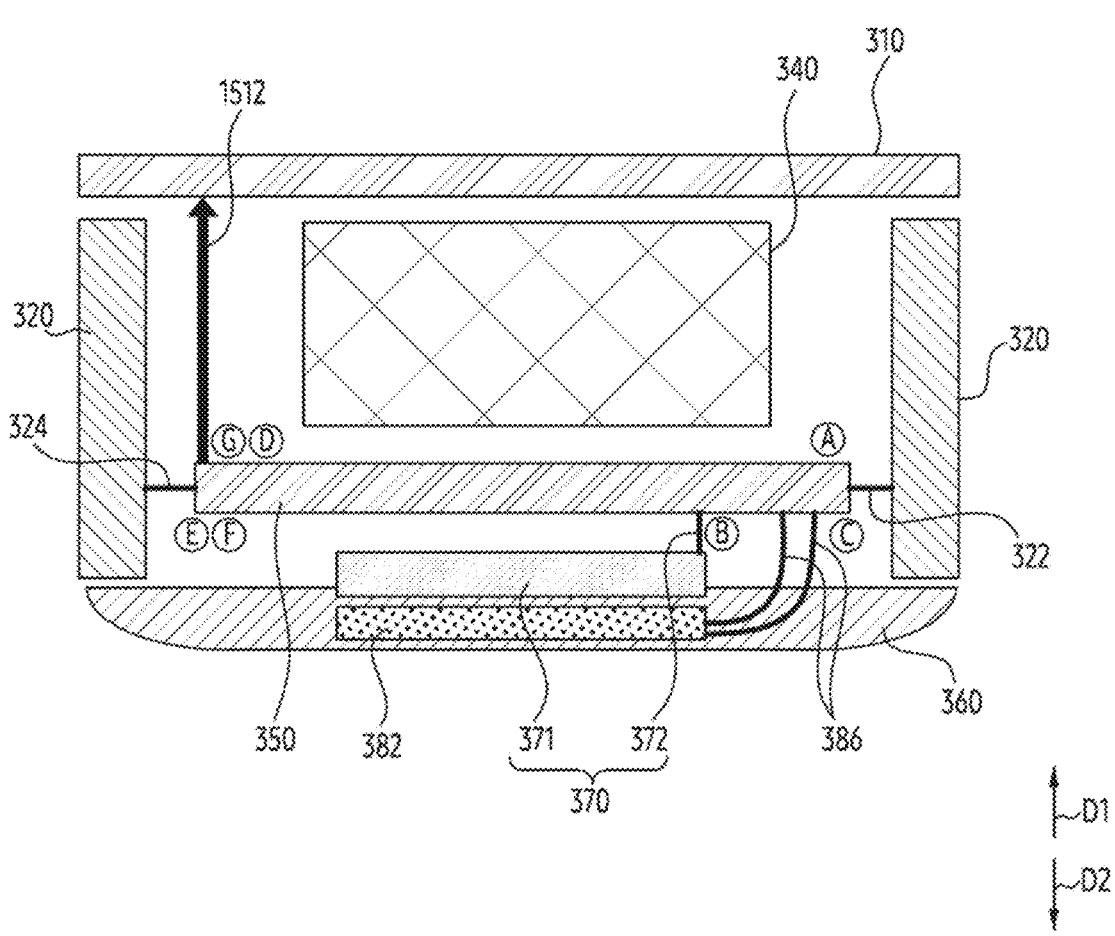
FIG. 15 is a diagram illustrating an electronic device according to one or more embodiments.

FIG. 15 is a diagram illustrating an electronic device according to one or more embodiments. Referring to FIG. 15, a display 310 of an electronic device 1500 (e.g., the electronic device 300 of FIG. 8) according to one or more embodiments may be connected to a seventh point G. The wireless communication circuit on a printed circuit board 350 may feed the display 310 through the seventh point G. A transmission line (or conductive trace) connecting the wireless communication circuit and the seventh point G may be formed on and/or within the printed circuit board 350. The wireless communication circuit may transmit an RF signal of a second frequency band different from the first frequency band by feeding the display 310. The wireless communication circuit may receive the RF signal of the second frequency band by using the display 310. The second frequency band may include, for example, a mid-band of 1,000 MHz to 2,300 MHz and/or a high-band of 2,300 MHz or more, but is not limited thereto. In one or more embodiments, a connection 1512 between the display 310 and the seventh point G may include, for example, a C-clip connector and/or a pogo pin, but is not limited thereto.

Referring to FIGS. 7A and 7B together, in one or more embodiments, the seventh point G may be located adjacent to a fourth point D that is connected to a connection member 312 of the display 310. For example, the seventh point G may be located on a second portion 352 of the printed circuit board 350. The seventh point G may be located farther from a first point A than a second point B and a third point C. Additionally or optionally, the electronic device 300 may include a matching circuit connected between the seventh point G and the wireless communication circuit for impedance matching.

Alternatively, a frame 320 of the electronic device 1500 may not be fed at the first point A. In this case, the frame 320 may operate as a portion of an antenna ground by being grounded through at least one of the first point A and a fifth point E.

Alternatively, the fifth point E or a sixth point F among the first to seventh points A to G may be omitted. For example, the frame 320 may not be connected to the fifth point E or the sixth point F.

Figure 16:
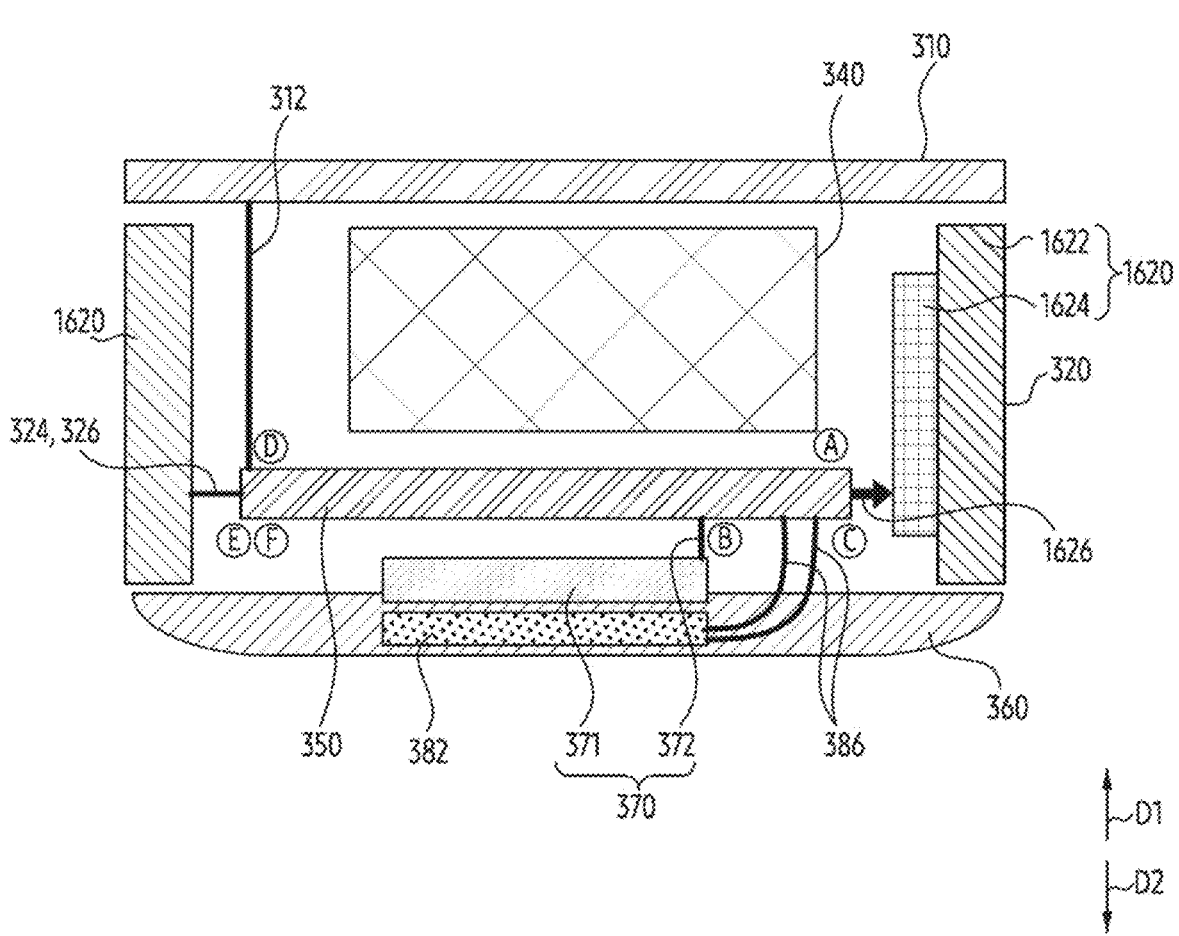
FIG. 16 is a diagram illustrating an electronic device according to one or more embodiments.

FIG. 16 is a diagram illustrating an electronic device according to one or more embodiments. An electronic device 1600 (e.g., the electronic device 300 of FIG. 8) according to one or more embodiments may include a frame 1620 (e.g., the frame 320 of FIG. 8). For example, the frame 1620 may further include a non-conductive portion 1622 and a conductive portion 1624 which is supported by an inner surface of the non-conductive portion 1622. In one or more embodiments, the conductive portion 1624 may include a conductive pattern. The conductive pattern may be formed directly on the non-conductive portion 1622, for example, or on a separate substrate (or carrier). For example, the conductive pattern may be formed through plating or deposition, but is not limited thereto. The conductive portion 1624 may include, for example, a conductive pattern of a flexible printed circuit board or a conductive pattern of an LDS antenna, but is not limited thereto.

In one or more embodiments, the conductive portion 1624 may be connected to a first point A on a printed circuit board 350. The wireless communication circuit may feed the conductive portion 1624 through the first point A. The wireless communication circuit may transmit an RF signal of the first frequency band by feeding the conductive portion 1624 of the frame 1620. The wireless communication circuit may receive the RF signal of the first frequency band by using the conductive portion 1624 of the frame 1620. In one or more embodiments, a connection 1626 between the first point A and the conductive portion 1624 may be formed, for example, by contacting the conductive portion 1624 with a connector (e.g., the C-clip connector) disposed on the first point A, but is not limited thereto. For example, the connection 1626 may be formed by conductive traces of a coaxial cable or the flexible printed circuit board connecting the first point A and the conductive portion 1624. The flexible printed circuit board may be a flexible printed circuit board on which the conductive portion 1624 is formed or a flexible printed circuit board independent of the conductive portion 1624. Additionally or optionally, an electronic device 300 may include a matching circuit connected between the first point A and the wireless communication circuit for impedance matching. The non-conductive portion 1622 of the frame 1620 may be referred to as a non-conductive frame.

Figure 17:
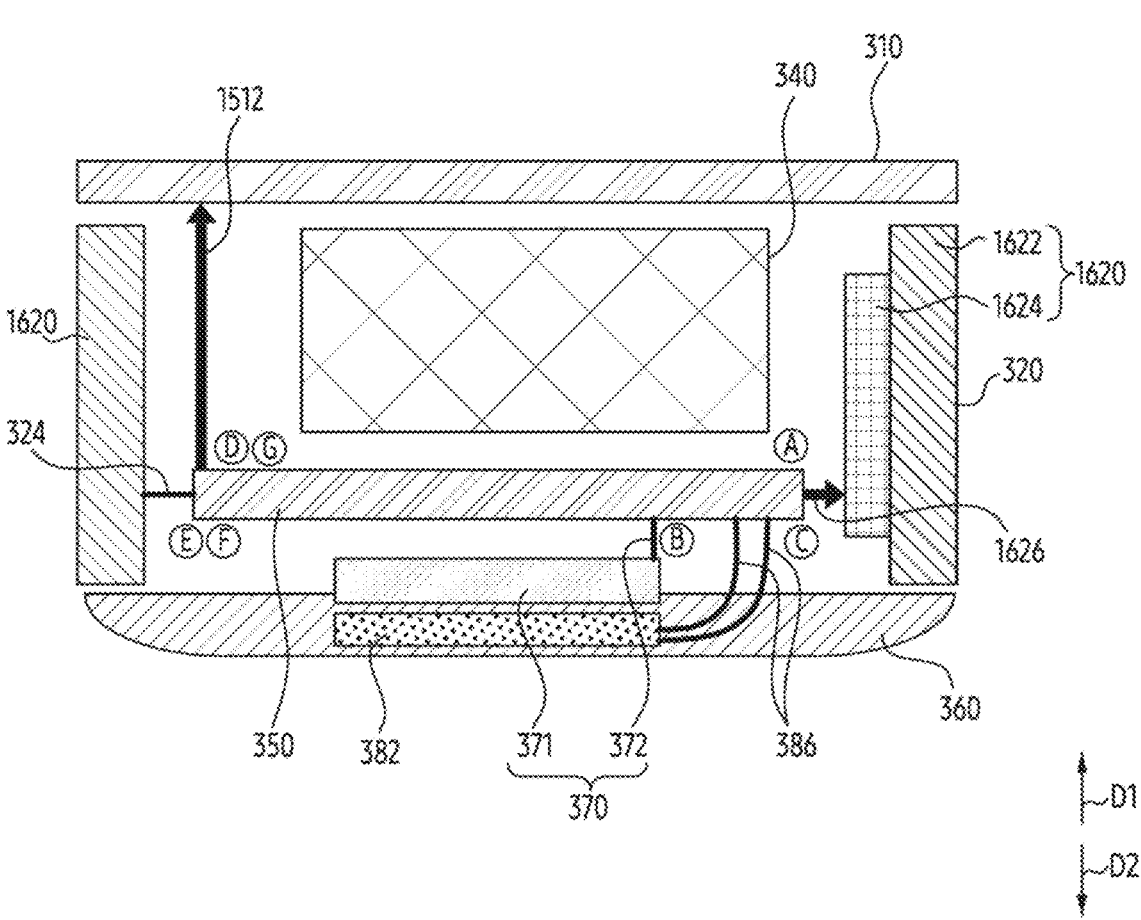
FIG. 17 is a diagram illustrating an electronic device according to one or more embodiments.

FIG. 17 is a diagram illustrating an electronic device according to one or more embodiments. Referring to FIG. 17, a display 310 of an electronic device 1700 (e.g., the electronic device 1600 of FIG. 16) according to one or more embodiments may be connected to a seventh point G. The wireless communication circuit on the printed circuit board 350 may feed the display 310 through the seventh point G.

Alternatively, the electronic device 1600 may not include a first point A among the first to seventh points A to G and a conductive portion 1624 of a frame 1620 connected to the first point A.

Figure 18:
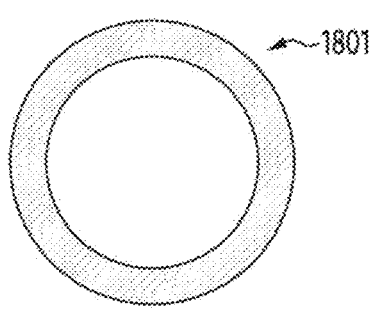
FIG. 18 illustrates shapes of a conductive member according to one or more embodiments.
Figure 18:
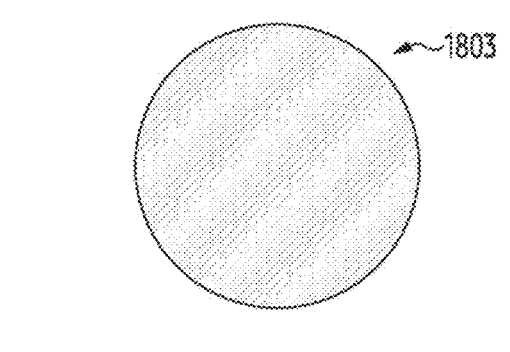
Figure 18:
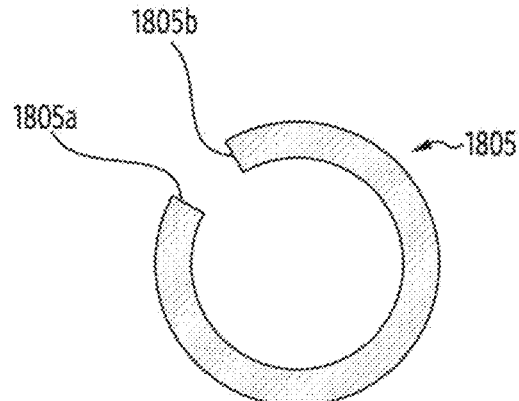

FIG. 18 illustrates shapes of a conductive member 370 according to one or more embodiments. Referring to FIG. 18, a first portion (e.g., the first portion 371 of FIG. 6) of a conductive member may be formed in various shapes. For example, a conductive member 1801 may include a closed ring shape. For example, a conductive member 1803 may include a circular plate shape. For example, a conductive member 1805 may include an open ring shape in some sections so that both ends 1805a and 1805b of the ring are formed, similar to the conductive member 370 of FIG. 6. In this case, one of the both ends 1805a and 1805b of the conductive member 1805 may be connected to a ground of a printed circuit board (e.g., the printed circuit board 350 of FIG. 17).

Figure 19:
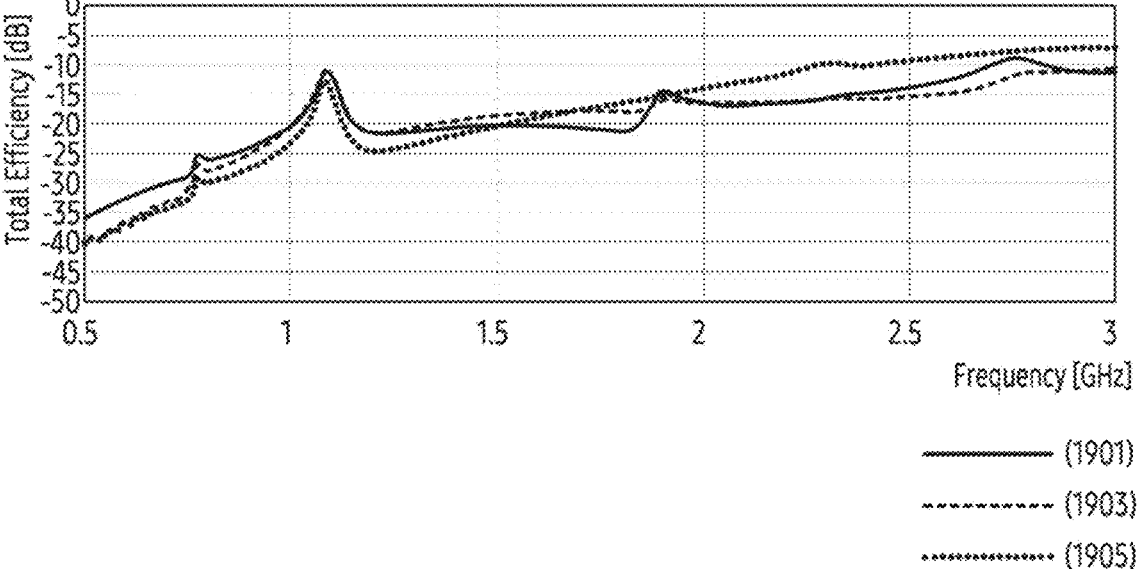
FIG. 19 is a graph illustrating radiation efficiency according to a shape of a conductive member, according to one or more embodiments.

FIG. 19 is a graph illustrating radiation efficiency according to a shape of a conductive member, according to one or more embodiments. Referring to FIG. 19 together with FIG. 18, a graph 1901 represents the radiation efficiency of an electronic device including a conductive member 1801, a graph 1903 represents the radiation efficiency of an electronic device including a conductive member 1803, and a graph 1905 represents the radiation efficiency of an electronic device including a conductive member 1805. The graph 1901 of the conductive member 1801 and the graph 1903 of the conductive member 1803 may have higher radiation efficiency in a relatively low frequency band (e.g., less than 1.5 GHz) than the graph 1905 of the conductive member 1805. This may be because an area where the conductive member 1801 and the conductive member 1803 face a wireless charging coil is larger than that of the conductive member 1805. In addition, the graph 1901 of the conductive member 1801 and the graph 1903 of the conductive member 1803 may have similar radiation efficiency in the relatively low frequency band (e.g., about less than 1.5 GHz). This may be because the area where the conductive member 1801 and the conductive member 1803 face the wireless charging coil is similar.

In one or more embodiments, the graph 1905 of the conductive member 1805 may have higher radiation efficiency in a relatively high frequency band (e.g., about 1.9 GHz or more) than the graphs 1901 and 1903.

A wearable device (e.g., the electronic device 300 of FIG. 3) according to one or more embodiments may comprise a metal frame (e.g., the frame 320 of FIG. 3), a display (e.g., the display 310 of FIG. 3), a printed circuit board (e.g., the printed circuit board 350 of FIG. 3), a wireless charging coil (e.g., the wireless charging coil 382 of FIG. 4), a conductive member (e.g., the conductive member 370 of FIG. 3), and a wireless communication circuit (a wireless communication module 2092 of FIG. 20) disposed on the printed circuit board. The conductive member may be disposed between the wireless charging coil and the printed circuit board, facing the wireless charging coil, and spaced apart from the wireless charging coil. The wireless communication circuit may be configured to transmit or receive a radio frequency (RF) signal using the metal frame. The conductive member may be coupled to the wireless charging coil. The conductive member, the wireless charging coil, and the display may be used as a ground for the metal frame.

In one or more embodiments, the PCB may include a first portion (e.g., the first portion 351 of FIG. 7A) forming a first part (e.g., the first part 351a of FIG. 7A) of a periphery of the PCB, a second portion (e.g., the second portion 352 of FIG. 7A) spaced apart from the first portion and forming a second part (e.g., the second part 352a of FIG. 7A) opposite the first part of the periphery, and a third portion (e.g., the third portion 353 of FIG. 7A) between the first portion and the second portion, forming a remaining part (e.g., the remaining part 353a of FIG. 7A) of the periphery. The wireless communication circuit may be configured to feed the metal frame that is connected to the first portion of the PCB. The conductive member and the wireless charging coil, which are used as the ground, may be respectively connected to the first portion. The display, which is used as the ground, may be connected to the second portion. The metal frame may be connected to the second portion.

In one or more embodiments, the wireless communication circuit may be configured to feed the metal frame through a first point (e.g., the first point A of FIG. 7A) on the first portion. The conductive member may be connected to a ground of the PCB through a second point (e.g., the second point B of FIG. 7A) on the first portion of the PCB. The wireless charging coil may be connected to the ground of the PCB through a third point (e.g., the third point C of FIG. 7A) on the first portion of the PCB. The display may be connected to the ground of the PCB through a fourth point (e.g., the fourth point D of FIG. 7A) on the second portion of the PCB. The metal frame may be connected to the ground of the PCB through a fifth point (e.g., the fifth point E of FIG. 7A) on the second portion of the PCB.

In one or more embodiments, when the PCB is viewed from above, the third point may be located between the first point and the second point.

In one or more embodiments, the second point may be closer to the first point than the fourth point and the fifth point.

In one or more embodiments, the third point may be closer to the first point than the fourth point and the fifth point.

The wearable device according to one or more embodiments may comprise a first flexible PCB (e.g., the connection member 312 of FIG. 8) connecting the display to the PCB, a first connector disposed on the PCB and coupled to the first flexible PCB, a second flexible PCB (e.g., the connection member 386 of FIG. 8) connecting the wireless charging coil to the PCB, a second connector disposed on the PCB and coupled to the second flexible PCB, a third connector disposed on the PCB and coupled to the conductive member.

In one or more embodiments, the third connector may include a C-clip connector. The conductive member may be in contact with the C-clip connector.

The wearable device according to one or more embodiments may comprise a shield can disposed on the PCB. The wireless communication circuit may be disposed on the third portion. The shield can may be disposed on the third portion to surround the wireless communication circuit.

The wearable device according to one or more embodiments may comprise at least one of a first plurality of matching circuits, a second plurality of matching circuits, and a matching circuit. The first plurality of matching circuits, wherein any one of the first plurality of matching circuits may be configured to be selectively connected between the ground of the PCB and the second point of the PCB. The second plurality of matching circuits, wherein any one of the second plurality of matching circuits may be configured to be selectively connected between the ground of the PCB and the fifth point of the PCB. The matching circuit may be connected between the wireless communication circuit and the first point.

In one or more embodiments, the conductive member may include a closed ring shape (e.g., the conductive member 1801 of FIG. 18), an open ring shape (e.g., the conductive member 1805 of FIG. 8) in a partial section so that both ends (e.g., the both ends 1805a and 1805b of FIG. 8) of the ring are formed, or a circular plate shape (e.g., the conductive member 1803 of FIG. 18).

In one or more embodiments, the conductive member may be formed in an open ring shape (e.g., the conductive member 1805 of FIG. 18) in a partial section so that both ends (e.g., the both ends 1805a and 1805b of FIG. 18) of the ring are formed. Based on a direction perpendicular to the PCB, the second point may overlap one end (e.g., the end 1805a of FIG. 18) of the both ends.

In one or more embodiments, the conductive member may include a first portion (e.g., the first portion 371 of FIG. 5) parallel to the PCB and facing the wireless charging coil, and a second portion (e.g., the second portion 372 of FIG. 5) extending from the first portion to the PCB and connecting the first portion to the PCB. The first portion may be spaced apart from the PCB.

The wearable device according to one or more embodiments may comprise a cover (e.g., the cover 360 of FIG. 3) coupled to the frame and in contact with a body wearing the wearable device. The cover may support the wireless charging coil.

The wearable device according to one or more embodiments may comprise a shielding member (e.g., the shielding member 384 of FIG. 4) covering the wireless charging coil that is supported by the cover. The cover may include a support portion (e.g., the support portion 365 of FIG. 4) including a first surface (e.g., the first surface 365A of FIG. 4) facing the conductive member and a second surface (e.g., the second surface 365B of FIG. 4) opposite to the first surface and facing the PCB. The shielding member may include a first surface (e.g., the first surface 384A of FIG. 4) facing the first surface of the support portion. The conductive member may be attached to the first surface of the support portion or the first surface of the shielding member.

In one or more embodiments, the second portion may penetrate the support portion.

The wearable device according to one or more embodiments may comprise a capacitor disposed on the PCB. The conductive member may be connected to the wireless charging coil through the capacitor.

A wearable device (e.g., the electronic device 300 of FIG. 3) according to one or more embodiments may comprise a frame (e.g., the frame 1620 of FIG. 16) including a conductive portion (e.g., the conductive portion 1624 of FIG. 16), a display (e.g., the display 310 of FIG. 3), a wireless charging coil (e.g., the wireless charging coil 382 of FIG. 4), a printed circuit board (e.g., the printed circuit board 350 of FIG. 3), a conductive member (e.g., the conductive member 370 of FIG. 3), and a wireless communication circuit (e.g., the wireless communication module 2092 of FIG. 20) disposed on the PCB. The conductive member may be disposed between the wireless charging coil and the PCB, facing the wireless charging coil, and spaced apart from the wireless charging coil. The wireless communication circuit may be configured to transmit or receive a radio frequency signal (RF signal) using the conductive portion. The conductive member may be coupled to the wireless charging coil. The conductive member, the wireless charging coil, and the display may be used as a ground for the conductive portion. The PCB may include a first portion (e.g., the first portion 351 of FIG. 7A) forming a first part (e.g., the first part 351a of FIG. 7A) of a periphery of the PCB, a second portion (e.g., the second portion 352 of FIG. 7A) spaced apart from the first portion and forming a second part (e.g., the second part 352a of FIG. 7A) opposite the first part of the periphery, and a third portion (e.g., the third portion 353 of FIG. 7A) between the first portion and the second portion, forming a remaining part (e.g., the remaining part 353a of FIG. 7A) of the periphery. The wireless communication circuit may be configured to feed the conductive portion through the first portion to which the conductive portion is connected. The conductive member and the wireless charging coil may be respectively grounded in the first portion. The display may be grounded in the second portion.

In one or more embodiments, the first portion may include a first point (e.g., the first point A of FIG. 7A) connected to the conductive portion, a second point (e.g., the second point B of FIG. 7A) at which the conductive member is grounded, and a third point (e.g., the third point C of FIG. 7A) at which the wireless charging coil is grounded. The second portion may include a fourth point (e.g., the fourth point D of FIG. 7A) at which the display is grounded. The wireless communication circuit may be configured to feed the conductive portion through the first point.

In one or more embodiments, an entirety of the frame may be formed of the conductive portion.

In one or more embodiments, the conductive portion may be grounded in the second portion.

In one or more embodiments, the conductive portion may be grounded at a fifth point on the second portion and at a sixth point (e.g., the sixth point F of FIG. 7A) spaced apart from the fifth point.

In one or more embodiments, the frame may include a non-conductive frame (e.g., the non-conductive portion 1622 of FIG. 16). The conductive portion may include a conductive pattern formed on an inner surface of the non-conductive frame.

In one or more embodiments, the second point may be closer to the first point than the fourth point and the fifth point. The third point may be closer to the first point than the fourth point and the fifth point.

In one or more embodiments, the conductive member may include a first portion (e.g., the first portion 371 of FIG. 3) facing the wireless charging coil and a second portion (e.g., the second portion 372 of FIG. 3) extending from the first portion such that the first portion is connected to the PCB. The first portion of the conductive member may be spaced apart from the PCB.

A wearable device (e.g., the electronic device 300 of FIG. 3) according to one or more embodiments may comprise a frame (e.g., the frame 320 of FIG. 3 and the frame 1620 of FIG. 16), a display (e.g., the display 310 of FIG. 3), a wireless charging coil (e.g., the wireless charging coil 382 of FIG. 4), a printed circuit board (e.g., the printed circuit board 350 of FIG. 3) between the display and the wireless charging coil, a conductive member (e.g., the conductive member 370 of FIG. 3), and a wireless communication circuit (e.g., the wireless communication module 2092 of FIG. 20) disposed on the PCB. The conductive member may be disposed between the wireless charging coil and the PCB. The conductive member may face the wireless charging coil. The conductive member may be spaced apart from the wireless charging coil. The wireless communication circuit may be configured to transmit or receive a radio frequency signal (RF signal) using the display. The conductive member may be coupled to the wireless charging coil. The conductive member and the wireless charging coil may be used as grounds for the display.

In one or more embodiments, the PCB may include a first portion (e.g., the first portion 371 of FIG. 7A) forming a first part (e.g., the first part 351a of FIG. 7A) of a periphery of the PCB, a second portion (e.g., the second portion 372 of FIG. 7A) spaced apart from the first portion and forming a second part (e.g., the second part 352a of FIG. 7A) opposite the first part of the periphery, and a third portion (e.g., the third portion 373 of FIG. 7A) between the first portion and the second portion, forming a remaining part (e.g., the remaining part 353a of FIG. 7A) of the periphery. The wireless communication circuit may transmit a signal in a first frequency band by feeding the frame through the first portion connected to the frame. The wireless communication circuit may be configured to transmit a signal in a second frequency band different from the first frequency band by feeding the display through the second portion connected to the display. The frame and the wireless charging coil may be respectively grounded in the first portion.

FIG. 20 is a block diagram illustrating an electronic device 2001 in a network environment 2000 according to various embodiments. Referring to FIG. 20, the electronic device 2001 in the network environment 2000 may communicate with an electronic device 2002 via a first network 2098 (e.g., a short-range wireless communication network), or at least one of an electronic device 2004 or a server 2008 via a second network 2099 (e.g., a long-range wireless communication network). According to one or more embodiments, the electronic device 2001 may communicate with the electronic device 2004 via the server 2008. According to one or more embodiments, the electronic device 2001 may include a processor 2020, memory 2030, an input module 2050, a sound output module 2055, a display module 2060, an audio module 2070, a sensor module 2076, an interface 2077, a connecting terminal 2078, a haptic module 2079, a camera module 2080, a power management module 2088, a battery 2089, a communication module 2090, a subscriber identification module (SIM) 2096, or an antenna module 2097. In some embodiments, at least one of the components (e.g., the connecting terminal 2078) may be omitted from the electronic device 2001, or one or more other components may be added in the electronic device 2001. In some embodiments, some of the components (e.g., the sensor module 2076, the camera module 2080, or the antenna module 2097) may be implemented as a single component (e.g., the display module 2060).

The processor 2020 may execute, for example, software (e.g., a program 2040) to control at least one other component (e.g., a hardware or software component) of the electronic device 2001 coupled with the processor 2020, and may perform various data processing or computation. According to one or more embodiments, as at least part of the data processing or computation, the processor 2020 may store a command or data received from another component (e.g., the sensor module 2076 or the communication module 2090) in volatile memory 2032, process the command or the data stored in the volatile memory 2032, and store resulting data in non-volatile memory 2034. According to one or more embodiments, the processor 2020 may include a main processor 2021 (e.g., a central processing unit (CPU) or an application processor (AP)), or an auxiliary processor 2023 (e.g., a graphics processing unit (GPU), a neural processing unit (NPU), an image signal processor (ISP), a sensor hub processor, or a communication processor (CP)) that is operable independently from, or in conjunction with, the main processor 2021. For example, when the electronic device 2001 includes the main processor 2021 and the auxiliary processor 2023, the auxiliary processor 2023 may be adapted to consume less power than the main processor 2021, or to be specific to a specified function. The auxiliary processor 2023 may be implemented as separate from, or as part of the main processor 2021.

The auxiliary processor 2023 may control at least some of functions or states related to at least one component (e.g., the display module 2060, the sensor module 2076, or the communication module 2090) among the components of the electronic device 2001, instead of the main processor 2021 while the main processor 2021 is in an inactive (e.g., sleep) state, or together with the main processor 2021 while the main processor 2021 is in an active state (e.g., executing an application). According to one or more embodiments, the auxiliary processor 2023 (e.g., an image signal processor or a communication processor) may be implemented as part of another component (e.g., the camera module 2080 or the communication module 2090) functionally related to the auxiliary processor 2023. According to one or more embodiments, the auxiliary processor 2023 (e.g., the neural processing unit) may include a hardware structure specified for artificial intelligence model processing. An artificial intelligence model may be generated by machine learning. Such learning may be performed, e.g., by the electronic device 2001 where the artificial intelligence is performed or via a separate server (e.g., the server 2008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2030 may store various data used by at least one component (e.g., the processor 2020 or the sensor module 2076) of the electronic device 2001. The various data may include, for example, software (e.g., the program 2040) and input data or output data for a command related thereto. The memory 2030 may include the volatile memory 2032 or the non-volatile memory 2034.

The program 2040 may be stored in the memory 2030 as software, and may include, for example, an operating system (OS) 2042, middleware 2044, or an application 2046.

The input module 2050 may receive a command or data to be used by another component (e.g., the processor 2020) of the electronic device 2001, from the outside (e.g., a user) of the electronic device 2001. The input module 2050 may include, for example, a microphone, a mouse, a keyboard, a key (e.g., a button), or a digital pen (e.g., a stylus pen).

The sound output module 2055 may output sound signals to the outside of the electronic device 2001. The sound output module 2055 may include, for example, a speaker or a receiver. The speaker may be used for general purposes, such as playing multimedia or playing record. The receiver may be used for receiving incoming calls. According to one or more embodiments, the receiver may be implemented as separate from, or as part of the speaker.

The display module 2060 may visually provide information to the outside (e.g., a user) of the electronic device 2001. The display module 2060 may include, for example, a display, a hologram device, or a projector and control circuitry to control a corresponding one of the display, hologram device, and projector. According to one or more embodiments, the display module 2060 may include a touch sensor adapted to detect a touch, or a pressure sensor adapted to measure the intensity of force incurred by the touch.

The audio module 2070 may convert a sound into an electrical signal and vice versa. According to one or more embodiments, the audio module 2070 may obtain the sound via the input module 2050, or output the sound via the sound output module 2055 or a headphone of an external electronic device (e.g., an electronic device 2002) directly (e.g., wiredly) or wirelessly coupled with the electronic device 2001.

The sensor module 2076 may detect an operational state (e.g., power or temperature) of the electronic device 2001 or an environmental state (e.g., a state of a user) external to the electronic device 2001, and then generate an electrical signal or data value corresponding to the detected state. According to one or more embodiments, the sensor module 2076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2077 may support one or more specified protocols to be used for the electronic device 2001 to be coupled with the external electronic device (e.g., the electronic device 2002) directly (e.g., wiredly) or wirelessly. According to one or more embodiments, the interface 2077 may include, for example, a high definition multimedia interface (HDMI), a universal serial bus (USB) interface, a secure digital (SD) card interface, or an audio interface.

A connecting terminal 2078 may include a connector via which the electronic device 2001 may be physically connected with the external electronic device (e.g., the electronic device 2002). According to one or more embodiments, the connecting terminal 2078 may include, for example, a HDMI connector, a USB connector, a SD card connector, or an audio connector (e.g., a headphone connector).

The haptic module 2079 may convert an electrical signal into a mechanical stimulus (e.g., a vibration or a movement) or electrical stimulus which may be recognized by a user via his tactile sensation or kinesthetic sensation. According to one or more embodiments, the haptic module 2079 may include, for example, a motor, a piezoelectric element, or an electric stimulator.

The camera module 2080 may capture a still image or moving images. According to one or more embodiments, the camera module 2080 may include one or more lenses, image sensors, image signal processors, or flashes.

The power management module 2088 may manage power supplied to the electronic device 2001. According to one or more embodiments, the power management module 2088 may be implemented as at least part of, for example, a power management integrated circuit (PMIC).

The battery 2089 may supply power to at least one component of the electronic device 2001. According to one or more embodiments, the battery 2089 may include, for example, a primary cell which is not rechargeable, a secondary cell which is rechargeable, or a fuel cell.

The communication module 2090 may support establishing a direct (e.g., wired) communication channel or a wireless communication channel between the electronic device 2001 and the external electronic device (e.g., the electronic device 2002, the electronic device 2004, or the server 2008) and performing communication via the established communication channel. The communication module 2090 may include one or more communication processors that are operable independently from the processor 2020 (e.g., the application processor (AP)) and supports a direct (e.g., wired) communication or a wireless communication. According to one or more embodiments, the communication module 2090 may include a wireless communication module 2092 (e.g., a cellular communication module, a short-range wireless communication module, or a global navigation satellite system (GNSS) communication module) or a wired communication module 2094 (e.g., a local area network (LAN) communication module or a power line communication (PLC) module). A corresponding one of these communication modules may communicate with the external electronic device via the first network 2098 (e.g., a short-range communication network, such as Bluetooth™, wireless-fidelity (Wi-Fi) direct, or infrared data association (IrDA)) or the second network 2099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2092 may identify and authenticate the electronic device 2001 in a communication network, such as the first network 2098 or the second network 2099, using subscriber information (e.g., international mobile subscriber identity (IMSI)) stored in the subscriber identification module 2096.

The wireless communication module 2092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2092 may support a high-frequency band (e.g., the mmWave band) to achieve, e.g., a high data transmission rate. The wireless communication module 2092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2092 may support various requirements specified in the electronic device 2001, an external electronic device (e.g., the electronic device 2004), or a network system (e.g., the second network 2099). According to one or more embodiments, the wireless communication module 2092 may support a peak data rate (e.g., 20 Gbps or more) for implementing eMBB, loss coverage (e.g., 2064 dB or less) for implementing mMTC, or U-plane latency (e.g., 0.5 ms or less for each of downlink (DL) and uplink (UL), or a round trip of 20 ms or less) for implementing URLLC.

The antenna module 2097 may transmit or receive a signal or power to or from the outside (e.g., the external electronic device) of the electronic device 2001. According to one or more embodiments, the antenna module 2097 may include an antenna including a radiating element composed of a conductive material or a conductive pattern formed in or on a substrate (e.g., a printed circuit board (PCB)). According to one or more embodiments, the antenna module 2097 may include a plurality of antennas (e.g., array antennas). In such a case, at least one antenna appropriate for a communication scheme used in the communication network, such as the first network 2098 or the second network 2099, may be selected, for example, by the communication module 2090 (e.g., the wireless communication module 2092) from the plurality of antennas. The signal or the power may then be transmitted or received between the communication module 2090 and the external electronic device via the selected at least one antenna. According to one or more embodiments, another component (e.g., a radio frequency integrated circuit (RFIC)) other than the radiating element may be additionally formed as part of the antenna module 2097.

According to various embodiments, the antenna module 2097 may form a mmWave antenna module. According to one or more embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 2001 and the external electronic device 2004 via the server 2008 coupled with the second network 2099. Each of the electronic devices 2002 or 2004 may be a device of a same type as, or a different type, from the electronic device 2001. According to one or more embodiments, all or some of operations to be executed at the electronic device 2001 may be executed at one or more of the external electronic devices 2002, 2004, or 2008. For example, if the electronic device 2001 should perform a function or a service automatically, or in response to a request from a user or another device, the electronic device 2001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2001. The electronic device 2001 may provide the outcome, with or without further processing of the outcome, as at least part of a reply to the request. To that end, a cloud computing, distributed computing, mobile edge computing (MEC), or client-server computing technology may be used, for example. The electronic device 2001 may provide ultra low-latency services using, e.g., distributed computing or mobile edge computing. In another embodiment, the external electronic device 2004 may include an internet-of-things (IoT) device. The server 2008 may be an intelligent server using machine learning and/or a neural network. According to one or more embodiments, the external electronic device 2004 or the server 2008 may be included in the second network 2099. The electronic device 2001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to one or more embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one or more embodiments, the module may be implemented in a form of an application-specific integrated circuit (ASIC).

Various embodiments as set forth herein may be implemented as software (e.g., the program 2040) including one or more instructions that are stored in a storage medium (e.g., internal memory 2036 or external memory 2038) that is readable by a machine (e.g., the electronic device 2001). For example, a processor (e.g., the processor 2020) of the machine (e.g., the electronic device 2001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to one or more embodiments, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Elements described as "module," "unit," or "part" may be physically implemented by analog and/or digital circuits including one or more of a logic gate, an integrated circuit, a microprocessor, a microcontroller, a memory circuit, a passive electronic component, an active electronic component, and the like.

While certain embodiments of the disclosure has been particularly shown and described, it will be understood that various changes in form and details may be made therein without departing from the spirit and scope of the following claims.

What is claimed is:

1. A wearable device comprising:
a metal frame;
a display;
a printed circuit board (PCB);
a wireless charging coil;
a conductive member disposed between the wireless charging coil and the PCB, facing the wireless charging coil, and spaced apart from the wireless charging coil; and
a wireless communication circuit disposed on the PCB,
wherein the wireless communication circuit is configured to transmit or receive a radio frequency (RF) signal using the metal frame,
wherein the conductive member is electrically coupled to the wireless charging coil, and
wherein the conductive member, the wireless charging coil, and the display are configured to be a ground for the metal frame.

2. The wearable device of claim 1,
wherein the PCB comprises:
a first portion forming a first part of a periphery of the PCB;
a second portion spaced apart from the first portion and forming a second part opposite the first part of the periphery; and
a third portion between the first portion and the second portion, forming a remaining part of the periphery,
wherein the wireless communication circuit is configured to feed the metal frame that is connected to the first portion of the PCB,
wherein the conductive member and the wireless charging coil are respectively connected to the first portion,
wherein the display is connected to the second portion, and
wherein the metal frame is connected to the second portion.

3. The wearable device of claim 2,
wherein the wireless communication circuit is configured to feed the metal frame through a first point on the first portion of the PCB,
wherein the conductive member is connected to a ground of the PCB through a second point on the first portion of the PCB,
wherein the wireless charging coil is connected to the ground of the PCB through a third point on the first portion of the PCB, wherein the display is connected to the ground of the PCB through a fourth point on the second portion of the PCB, and
wherein the metal frame is connected to the ground of the PCB through a fifth point on the second portion of the PCB.

4. The wearable device of claim 3, wherein, from an above view of the PCB, the third point is located between the first point and the second point.

5. The wearable device of claim 3, wherein the second point is closer to the first point than the second point is to the fourth point and the fifth point.

6. The wearable device of claim 3, wherein the third point is closer to the first point than the third point is to the fourth point and the fifth point.

7. The wearable device of claim 3, further comprising at least one of:
a first plurality of matching circuits, wherein any one of the first plurality of matching circuits is configured to be selectively connected between the ground and the second point of the PCB;
a second plurality of matching circuits, wherein any one of the second plurality of matching circuits is configured to be selectively connected between the ground and the fifth point of the PCB; or
a matching circuit connected between the wireless communication circuit and the first point of the PCB.

8. The wearable device of claim 3,
wherein the conductive member has an open ring shape with two open ends, and
wherein based on a direction perpendicular to the PCB, the second point overlaps one end of the two open ends.

9. The wearable device of claim 2, further comprising:
a first flexible PCB connecting the display to the PCB;
a first connector disposed on the PCB and coupled to the first flexible PCB;
a second flexible PCB connecting the wireless charging coil to the PCB;
a second connector disposed on the PCB and coupled to the second flexible PCB; and
a third connector disposed on the PCB and coupled to the conductive member.

10. The wearable device of claim 9,
wherein the third connector comprises a C-clip connector, and
wherein the conductive member is in contact with the C-clip connector.

11. The wearable device of claim 2, further comprising:
a shield can disposed on the PCB,
wherein the wireless communication circuit is disposed on the third portion of the PCB, and
wherein the shield can is disposed on the third portion around the wireless communication circuit.

12. The wearable device of claim 1, wherein the conductive member comprises:
a closed ring shape;
an open ring shape with two open ends; or
a circular plate shape.

13. The wearable device of claim 1,
wherein the conductive member comprises:
a first portion parallel to the PCB and facing the wireless charging coil; and
a second portion extending from the first portion to the PCB and connecting the first portion to the PCB, and
wherein the first portion of the conductive member is spaced apart from the PCB.

14. The wearable device of claim 13, further comprising:
a cover coupled to the metal frame and configured to contact a body wearing the wearable device,
wherein the cover supports the wireless charging coil.

15. The wearable device of claim 14, further comprising:
a shielding member covering the wireless charging coil that is supported by the cover,
wherein the cover comprises a support portion comprising a first surface facing the conductive member and a second surface opposite to the first surface and facing the PCB,
wherein the shielding member comprises a first surface facing the first surface of the support portion, and
wherein the conductive member is attached to the first surface of the support portion or the first surface of the shielding member.

16. The wearable device of claim 15, wherein the second portion of the conductive member penetrates the support portion.

17. The wearable device of claim 1, further comprising:
a capacitor disposed on the PCB,
wherein the conductive member is connected to the wireless charging coil through the capacitor.

18. A wearable device comprising:
a frame comprising a conductive portion;
a display;
a wireless charging coil;
a printed circuit board (PCB);
a conductive member disposed between the wireless charging coil and the PCB, facing the wireless charging coil, and spaced apart from the wireless charging coil; and
a wireless communication circuit disposed on the PCB,
wherein the wireless communication circuit is configured to transmit or receive a radio frequency signal (RF signal) using the conductive portion, wherein the conductive member is electrically coupled to the wireless charging coil,
wherein the conductive member, the wireless charging coil, and the display are configured to be a ground for the conductive portion,
wherein the PCB comprises:
a first portion forming a first part of a periphery of the PCB;
a second portion spaced apart from the first portion and forming a second part opposite the first part of the periphery; and
a third portion between the first portion and the second portion, forming a remaining part of the periphery,
wherein the wireless communication circuit is configured to feed the conductive portion through the first portion to which the conductive portion is connected,
wherein the conductive member and the wireless charging coil are configured to be respectively grounded in the first portion, and
wherein the display is configured to be grounded in the second portion.

19. The wearable device of claim 18,
wherein the first portion comprises:
a first point connected to the conductive portion, the wireless communication circuit configured to feed the conductive portion through the first point;
a second point at which the conductive member is configured to be grounded; and
a third point at which the wireless charging coil is configured to be grounded, and
wherein the second portion comprises a fourth point at which the display is configured to be grounded.

20. The wearable device of claim 19, wherein an entirety of the frame is formed of the conductive portion.

* * * * *